(12) United States Patent
Conte et al.

(10) Patent No.: US 12,494,249 B2
(45) Date of Patent: Dec. 9, 2025

(54) NON-VOLATILE MEMORY DEVICE AND CORRESPONDING METHOD OF OPERATION

(71) Applicants: STMICROELECTRONICS S.r.l., Agrate Brianza (IT); STMICROELECTRONICS (ALPS) SAS, Grenoble (FR)

(72) Inventors: Antonino Conte, Tremestieri Etneo (IT); Agatino Massimo Maccarrone, Regalbuto (IT); Francesco Tomaiuolo, Acireale (IT); Thomas Jouanneau, Saint-Égrève (FR); Vincenzo Russo, S. Maria di Licodia (IT)

(73) Assignees: STMICROELECTRONICS S.r.l., Agrate Brianza (IT); STMICROELECTRONICS (ALPS) SAS, Grenoble (FR)

( * ) Notice: Subject to any disclaimer, the term of this patent is extended or adjusted under 35 U.S.C. 154(b) by 171 days.

(21) Appl. No.: 18/464,093

(22) Filed: Sep. 8, 2023

(65) Prior Publication Data
US 2024/0096412 A1 Mar. 21, 2024

(30) Foreign Application Priority Data
Sep. 14, 2022 (IT) .................. 102022000018825

(51) Int. Cl.
*G11C 13/00* (2006.01)
*H03K 19/0185* (2006.01)
*H03K 19/20* (2006.01)

(52) U.S. Cl.
CPC ...... *G11C 13/0028* (2013.01); *G11C 13/0004* (2013.01); *H03K 19/018521* (2013.01); *H03K 19/20* (2013.01)

(58) Field of Classification Search
CPC ... G11C 13/0028; G11C 13/0004; G11C 8/08; G11C 16/08; H03K 19/018521; H03K 19/20
USPC ........................................................ 365/163
See application file for complete search history.

(56) References Cited

U.S. PATENT DOCUMENTS

| 5,854,770 | A | 12/1998 | Pascucci |
| 8,699,294 | B2 | 4/2014 | Chung |
| 10,593,400 | B2 | 3/2020 | Conte |
| 2021/0183442 | A1* | 6/2021 | Disegni .............. G11C 13/0028 |

\* cited by examiner

*Primary Examiner* — Fernando Hidalgo
(74) *Attorney, Agent, or Firm* — Seed Intellectual Property Law Group LLP

(57) ABSTRACT

In a non-volatile memory device, a memory sector is provided. The memory sector includes a plurality of tiles arranged horizontally. Each tile includes a plurality of memory cells arranged in horizontal word lines and vertical bit lines. A pre-decoder is configured to receive a set of encoded address signals to produce pre-decoding signals. A central row decoder is arranged in line with the plurality of tiles, receives the pre-decoding signals and produces level-shifted pull-up and pull-down driving signals for driving the word lines. First buffer circuits are arranged on a first side of each tile. Each of the first buffer circuits is coupled to a respective word line, receives a level-shifted pull-up driving signal and a level-shifted pull-down driving signal, and selectively pulls up or pulls down the respective word line as a function of the values of the received signals.

17 Claims, 14 Drawing Sheets

NON-VOLATILE MEMORY DEVICE AND CORRESPONDING METHOD OF OPERATION

BACKGROUND

Technical Field

The description relates to a row decoding circuit architecture for a non-volatile memory (NVM).

Description of the Related Art

Non-volatile memories known in the art include so-called embedded phase-change memories (ePCM). U.S. patent Ser. No. 10/593,400B2 is exemplary of such known memory devices and is hereby incorporated herein by reference in its entirety.

In a known manner, the memory cells are arranged in a memory array in rows formed by word lines (WL) and columns formed by bit lines (BL). Each memory cell includes a phase-change element and a selector element. The selector element may include a metal-oxide-semiconductor field-effect transistor (MOSFET or MOS transistor in short) or, more commonly, a bipolar junction transistor (BJT), which is electrically coupled in series with the phase-change element so as to enable selective passage of a programming or reading electric current therethrough. In the case of selector elements of a BJT type (also referred to as "BJT selector" in the present description), the phase-change element is coupled between the emitter terminal of the BJT selector (in the example, of a pnp type) and a respective bit line. In addition, the base terminal of the BJT selector is electrically coupled to a respective word line. The base terminals of the BJT selectors of the memory cells of a same row are coupled to a same word line, and the phase-change elements of the memory cells of a same column are coupled to a same bit line. The collector terminals of the BJT selectors are coupled to a reference terminal and set at a reference voltage, for example a ground reference voltage GND. When a memory cell has to be accessed (e.g., in reading operation or in writing operation), the word line coupled to the respective BJT selector is driven to a low voltage (e.g., the ground voltage) and the bit line coupled to the respective phase-change element is driven to a positive voltage. Due to the current conduction through the base terminals of the BJT selectors, when a word line is selected (e.g., driven to a low voltage) current flows through the word line itself and through the buffer circuit that drives the word line.

The word lines and bit lines are driven by row decoders (or word line decoders) and column decoders (or bit line decoders), respectively. The architecture of row decoders and column decoders in non-volatile memories plays a role in providing high performance (e.g., high writing speed and/or reading speed). Generally, in order to implement the selection of a word line with current injected by a BJT, the driving capability of the word line decoder is a relevant design parameter. Fast selection in reading despite resistive-capacitive (RC) loading distributed along the word line is targeted, as well as a low area of the decoder circuit itself.

In order to improve the performance of the row decoders, in the case of ePCMs using BJT selectors, the decoders are conventionally distributed at the tile level (e.g., around the tiles). However, the distribution of decoders at the tile level imposes certain constraints as to the area and speed of the decoder circuits, and relies on the exploitation of two different voltage domains during read operation and write operation, respectively. In particular, read operations may be carried out using a driving voltage in the range of 0 V to about 1.6 V, while write operations may be carried out using a driving voltage in the range of 0 V to about 4.5 V, or even up to about 5.5 V for a limited time in some cases.

In certain architectures, only two types (or "flavors") of MOS transistors are available for implementing the row decoders. These types of transistors are indicated herein as transistors GO1 (having a thin oxide, and thus an operating voltage of about 0.9 V) and transistors GO3 (having a thick oxide, and thus an operating voltage of about 3.6 V). Transistors GO1 are conventionally faster than transistors GO3. However, these architectures may call for elevation of the driving voltage to 3.6 V to achieve fast propagation.

Therefore, it would be beneficial in the art to provide improved row decoder architectures for non-volatile memories, having a high speed, low area and low power consumption.

BRIEF SUMMARY

One or more embodiments contribute in providing improved row decoder architectures.

According to one or more embodiments, such improved row decoder architectures can be achieved by a memory device having the features set forth in the claims that follow.

One or more embodiments may relate to a corresponding method of operating a memory device.

According to a first aspect of the present description, a non-volatile memory device includes at least one memory sector. Each memory sector includes a plurality of tiles arranged horizontally. Each tile of the plurality of tiles includes a plurality of memory cells arranged in an array of word lines extending horizontally and bit lines extending vertically. The memory cells of a same row are coupled to a same word line and the memory cells of a same column are coupled to a same bit line. The memory device includes a pre-decoder configured to receive a set of encoded address signals and including a combinatorial circuit configured to produce pre-decoding signals as a function of the encoded address signals. A combination of values of the pre-decoding signals identifies one word line within the at least one memory sector. The memory device includes a central row decoder arranged in line with the plurality of tiles of the at least one memory sector. The central row decoder is configured to receive the pre-decoding signals and process the pre-decoding signals to produce level-shifted pull-up driving signals and level-shifted pull-down driving signals for driving the word lines to a selected state or an unselected state. The memory device includes a respective first set of first buffer circuits arranged on a first side of each of the tiles of the plurality of tiles. Each of the first buffer circuits is coupled to a respective word line of the tile and is configured to receive a level-shifted pull-up driving signal out of the level-shifted pull-up driving signals, receive a level-shifted pull-down driving signal out of the level-shifted pull-down driving signals, and selectively pull-up or pull-down the respective word line as a function of the values of the received level-shifted pull-up driving signal and level-shifted pull-down driving signal. The memory device includes a respective second set of second buffer circuits arranged on a second side (e.g., opposite to the first side) of each of the tiles of the plurality of tiles. Each of the second buffer circuits is coupled to a respective word line of the tile and is configured to receive a level-shifted pull-down driving signal out of the level-shifted pull-down driving signals, and selectively pull-down the respective word line as a function of the value of the received level-shifted pull-down driving signal. The pre-decoding signals are in the voltage range of 0 V to about 0.9 V, and the level-shifted pull-up driving signals and level-shifted pull-down driving signals are in the voltage range of 0 V to a tile supply voltage of the at least one memory sector.

One or more embodiments may thus provide a row decoder architecture that operates at high speed, occupies a low area and has a low power consumption.

In one or more embodiments, each of the first buffer circuits includes a pull-up p-channel MOS transistor and a p-channel cascode transistor having their current paths arranged in series between a tile supply voltage node that provides the tile supply voltage and the respective word line of the first buffer circuit. A gate terminal of the pull-up p-channel MOS transistor receives the level-shifted pull-up driving signal and a gate terminal of the p-channel cascode transistor receives a pull-up cascode control signal. Each of the first buffer circuits includes a pull-down n-channel MOS transistor and an n-channel cascode transistor having their current paths arranged in series between the respective word line of the first buffer circuit and a ground voltage node that provides a ground voltage. A gate terminal of the pull-down n-channel MOS transistor receives the level-shifted pull-down driving signal and a gate terminal of the n-channel cascode transistor receives a pull-down cascode control signal. Each of the second buffer circuits includes a further pull-down n-channel MOS transistor and a further n-channel cascode transistor having their current paths arranged in series between the respective word line of the second buffer circuit and the ground voltage node. A gate terminal of the further pull-down n-channel MOS transistor receives the level-shifted pull-down driving signal and a gate terminal of the further n-channel cascode transistor receives the pull-down cascode control signal.

In one or more embodiments, during read operation, the tile supply voltage is set to a value in the range of 1.5 V to 1.8 V, the pull-down cascode control signal is set to a value equal to the tile supply voltage, the pull-up cascode control signal is set to a value equal to the ground voltage, the level-shifted pull-down driving signal is set to a value equal to the tile supply voltage to select the respective word line or to a value equal to the ground voltage to deselect the respective word line, and the level-shifted pull-up driving signal is set to a value equal to the tile supply voltage minus a threshold to select the respective word line or to a value equal to the ground voltage to deselect the respective word line. During write operation, the tile supply voltage is set to a value in the range of 3.5 V to 4.5 V, the pull-down cascode control signal is set to a value equal to half of the tile supply voltage, the pull-up cascode control signal is set to a value equal to half of the tile supply voltage, the level-shifted pull-down driving signal is set to a value equal to half of the tile supply voltage to select the respective word line or to a value equal to the ground voltage to deselect the respective word line, and the level-shifted pull-up driving signal is set to a value equal to the tile supply voltage minus a threshold to select the respective word line or to a value equal to half of the tile supply voltage to deselect the respective word line.

In one or more embodiments, the tile supply voltage, the pull-up cascode control signal and the pull-down cascode control signal are routed vertically within the at least one memory sector. The level-shifted pull-down driving signals are routed horizontally within the at least one memory sector towards the first buffer circuits and the second buffer circuits that drive a same word line. The level-shifted pull-up driving signals are routed both vertically and horizontally within the at least one memory sector towards groups of the first buffer circuits that drive groups of word lines.

In one or more embodiments, the first buffer circuits in the first set of first buffer circuits are arranged in at least a first subset and a second subset. The first and second subsets are spatially contiguous in the vertical direction. The first buffer circuits in the first subset receive a same level-shifted pull-up driving signal and are configured to drive a respective first subset of word lines (e.g., even-numbered word lines) of the tile. The first buffer circuits in the second subset receive a same level-shifted pull-up driving signal different from the level-shifted pull-up driving signal received by the first buffer circuits in the first subset, and are configured to drive a respective second subset of word lines (e.g., odd-numbered word lines) of the tile. The word lines of the first subset are interleaved with the word lines of the second subset.

In one or more embodiments, the central row decoder includes a plurality of pull-up driver circuits. Each of the pull-up driver circuits is configured to receive a respective first pre-decoding signal, a respective second pre-decoding signal and a respective third pre-decoding signal. Each of the pull-up driver circuits includes a level-shifting NAND logic gate configured to receive as input the respective first, second and third pre-decoding signals to assert and de-assert a respective pull-up control signal. Each of the pull-up driver circuits is configured to produce a respective level-shifted pull-up driving signal by passing to its output a pull-up bias voltage in response to the respective pull-up control signal being de-asserted, and passing a shifted ground voltage in response to the respective pull-up control signal being asserted.

In one or more embodiments, the central row decoder includes a plurality of pull-down driver circuits. Each of the pull-up driver circuits is configured to receive a respective first pre-decoding signal, a respective second pre-decoding signal and a respective third pre-decoding signal. Each of the pull-up driver circuits includes a level-shifting NAND logic gate configured to receive as input the respective first, second and third pre-decoding signals to assert and de-assert a respective pull-down control signal. Each of the pull-up driver circuits includes a plurality of buffer arrangements. Each of the buffer arrangements is configured to receive as input the respective pull-down control signal, a respective fourth pre-decoding signal and the complement of the fourth pre-decoding signal. Each of the buffer arrangements is configured to produce a respective level-shifted pull-down driving signal by passing to its output the respective fourth pre-decoding signal in response to the respective pull-down control signal being de-asserted, and passing the ground voltage in response to the respective pull-down control signal being asserted or the complement of the fourth pre-decoding signal being asserted.

According to another aspect of the present description, a method of operating a non-volatile memory device includes:
  receiving, at the pre-decoder, a set of encoded address signals and producing pre-decoding signals as a function of the encoded address signals, wherein the pre-decoding signals are in the voltage range of 0 V to about 0.9 V and a combination of values of the pre-decoding signals identifies one word line within the at least one memory sector;
  receiving, at the central row decoder, the pre-decoding signals and processing the pre-decoding signals to produce level-shifted pull-up driving signals and level-shifted pull-down driving signals for driving the word lines to a selected state or an unselected state, wherein the level-shifted pull-up driving signals and level-shifted pull-down driving signals are in the voltage range of 0 V to a tile supply voltage of the at least one memory sector;

receiving, at each of the first buffer circuits, a level-shifted pull-up driving signal out of the level-shifted pull-up driving signals and a level-shifted pull-down driving signal out of the level-shifted pull-down driving signals;

selectively pulling up or pulling down the respective word line, via each of the first buffer circuits, as a function of the values of the level-shifted pull-up driving signal and level-shifted pull-down driving signal received at each of the first buffer circuits;

receiving, at each of the second buffer circuits, a level-shifted pull-down driving signal out of the level-shifted pull-down driving signals;

selectively pulling down the respective word line, via each of the second buffer circuits, as a function of the value of the level-shifted pull-down driving signal received at each of the second buffer circuits.

BRIEF DESCRIPTION OF THE SEVERAL VIEWS OF THE DRAWINGS

One or more embodiments will now be described, by way of example only, with reference to the annexed figures, wherein.

DETAILED DESCRIPTION

In the ensuing description, one or more specific details are illustrated, providing an in-depth understanding of some examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is included in at least one embodiment. Hence, phrases such as "in an embodiment" or "in one embodiment" that may be present in one or more points of the present description do not necessarily refer to one and the same embodiment. Moreover, particular configurations, structures, or characteristics may be combined in any adequate way in one or more embodiments.

The headings/references used herein are provided merely for convenience and hence do not define the extent of protection or the scope of the embodiments.

Throughout the figures annexed herein, unless the context indicates otherwise, like parts or elements are indicated with like references/numerals and a corresponding description will not be repeated for the sake of brevity.

U.S. patent Ser. No. 10/593,400B2 discloses various features of memory arrays (in particular, ePCM arrays), such as their general architecture and layout, which may be applied to embodiments of the instant description as well. Therefore, document U.S. patent Ser. No. 10/593,400B2 is hereby incorporated herein by reference in its entirety.

Figure 1:
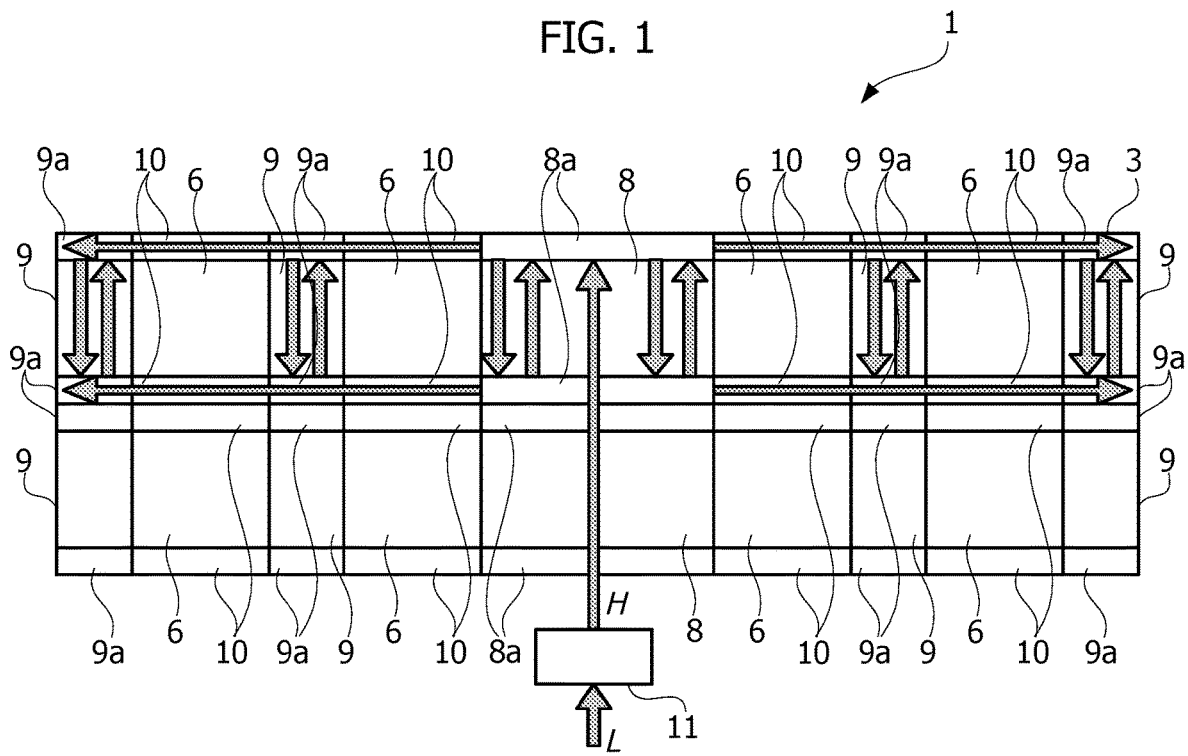
FIG. 1 is a diagram exemplary of the architecture of a non-volatile memory device.

By way of introduction to the detailed description of exemplary embodiments, reference may first be made to FIG. 1, which is a schematic illustration of a section of a memory array 3 of a non-volatile memory device 1, in particular of the phase-change type. The memory array 3 is divided into portions or "tiles" 6, which are in turn grouped together in groups of tiles (e.g., memory sectors) that are arranged on a same row and are jointly subjected to an operation of reading of a word made up of a certain number of bits. The row decoder of the memory device 1 includes a main row decoding unit 8 for each group of tiles 6 (e.g., each sector), and a number of local row decoding units 9 (e.g., one for each tile 6 that is to be addressed in order to reconstruct the word), which are configured to carry out local selection and biasing of the word lines WL of each tile 6, on the basis of decoded address signals and biasing signals received from the main row decoding unit 8. In particular, each local row decoding unit 9 may include a first local-decoding element and a second local-decoding element, arranged on opposite sides of the respective tiles 6 (in the direction of the rows or word lines WL), coupled to a respective set of word lines WL. Each local-decoding element is configured to implement biasing of each of the respective word lines WL alternatively to the ground reference voltage GND (in the selected state, for a memory operation of reading or writing/programming) or to a tile supply voltage (in the non-selected state). Additionally, the main row decoding unit 8 may be coupled to respective pre-decoding buffers 8a, and each local row decoding unit 9 may be coupled to respective local pre-decoding buffers 9a.

Likewise, the column decoder of the memory device 1 includes a plurality of local column-decoding units 10 (e.g., one for each tile 6), which enable selection and biasing of the local bit lines BL associated to which are the memory cells that are to be read, and their connection to respective sense amplifiers (SAs), configured for comparison of the reading currents of the (direct and complementary) memory cells associated to each bit of the data word.

In a conventional architecture, the pre-decoding buffers are implemented with GO3 transistors driven by gate signals at 3.6 V. Therefore, pre-decoding signals L at 0.9 V may be received at one or more voltage shifters 11 that shift them to produce pre-decoding signals H at 3.6 V, and the pre-decoding signals H may be propagated from the voltage shifter 11 to the main row decoding unit 8, the pre-decoding buffers 8a, the local pre-decoding buffers 9a, and then to the local row decoding units 9 (as exemplified by the thick arrows in FIG. 1). The row and column decoder architecture is constrained by the tile routing; in particular, four metal levels may be used inside and/or around each tile, with lower metal levels M1 and M2 used for routing the local bit lines BL in a column direction (e.g., vertical, from top to bottom in the Figures annexed herein) and higher metals levels M3 and C4 used for routing the local word lines WL in a row direction (e.g., horizontal, from left to right in the Figures annexed herein). An additional C5 vertical layer may be used for the main bit lines BL. Therefore, only one additional metal level with adequate pitch is available for routing the pre-decoding signals at 3.6 V, e.g., a C6 metal level (the pitch of metal level C6 being equal to 80 nm, while the pitch of the memory cells of the array in the vertical direction may be about 108 nm). The word lines may be shorted among tiles 6 to allow usage of p-channel MOS transistors (PMOS) only in the main row decoding unit 8. The pre-decoding buffers 8a and 9a may be fully implemented with n-channel MOS transistors (NMOS). This approach facilitates saving area avoiding the implementation of large GO3 PMOS buffers in the pre-decoding buffers 8a and 9a, which would operate with low overdrive compared to an NMOS implementation.

Therefore, in an architecture as exemplified in FIG. 1, in case of a sector (e.g., a group of tiles) of 256 KB, about 112 pre-decoding signals have to be elevated at 3.6 V. About 96 pre-decoding signals are buffered locally and routed vertically for the local row decoder buffers 9a. A high number of local buffers 9a may be called for, which impacts on the area constraints. Additionally, a high amount of parasitic capacitances switch at a voltage of about 3.6 V, supplied by a charge pump. As a result, a high pre-decoding power consumption is entailed, a high propagation delay due to long propagation paths is entailed, a limitation in the buffering of the local column-decoding units 10 due to local buffer area availability (in particular, constrained by the lateral dimensions X and Y of local rows and columns) is entailed.

Figure 2:
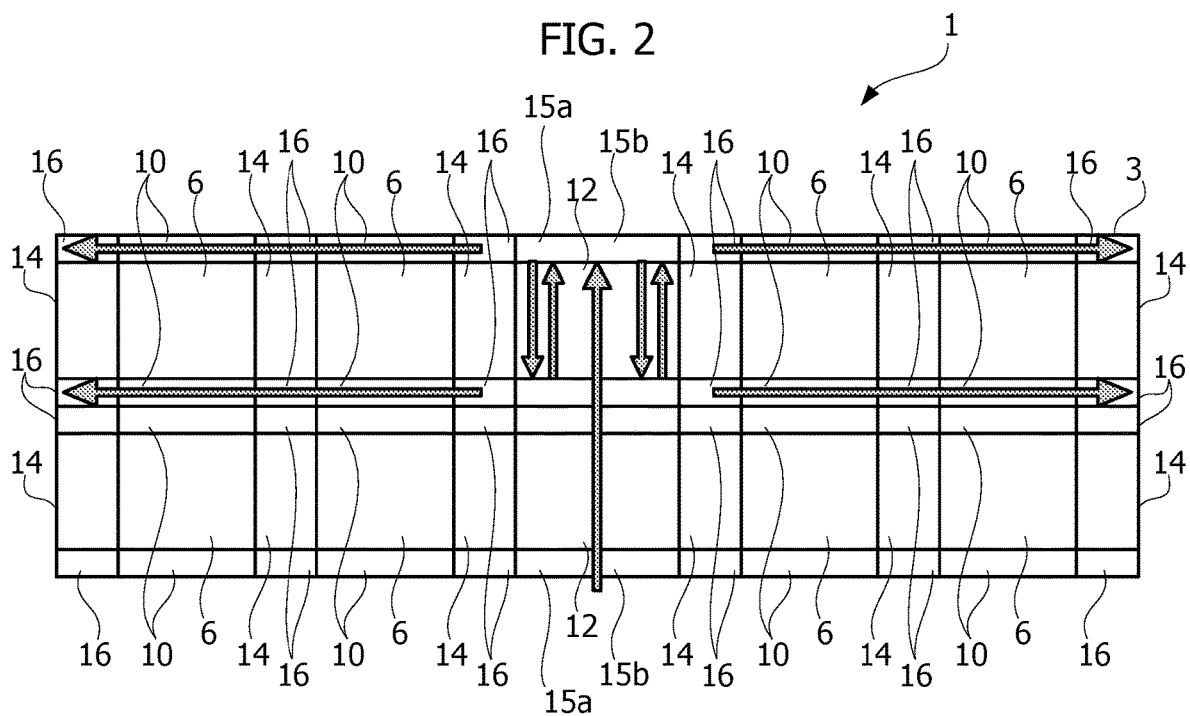
FIG. 2 is a diagram exemplary of the architecture of a non-volatile memory device according to one or more embodiments of the present description.

Therefore, one or more embodiments may relate to a row decoding architecture as exemplified in FIG. 2, which makes use of MOS transistors GO1 and GO2, the latter having an oxide that is thicker than transistors GO1 and thinner than transistors GO3 (e.g., resulting in an operating voltage of about 1.8 V). FIG. 2 is a schematic illustration of a section of a memory array 3 of a non-volatile memory device 1, in particular of the phase-change type. Similarly to the architecture of FIG. 1, the memory array 3 is divided into tiles 6, which are grouped together horizontally in groups of tiles (e.g., sectors). The row decoder of the memory device 1 includes a central row decoder 12 for each group of tiles 6, arranged substantially in the area occupied by the main row decoding unit 8 of the architecture of FIG. 1. The row decoder of the memory device 1 further includes local row decoder buffer stages 14 associated to each tile 6 and arranged substantially in the area occupied by the row decoding units 9 of the architecture of FIG. 1. The local row decoder buffer stages 14 are configured to carry out local selection and biasing of the word lines WL of each tile 6, on the basis of decoded address signals and biasing signals received from the central row decoder 12. In particular, each local row decoder buffer stage 14 may include a first local buffer element and a second local buffer element, arranged on opposite sides of the respective tile 6 (in the direction of the rows or word lines WL), coupled to a respective set of word lines WL. As further discussed in the following, the first local buffer element may be configured to implement biasing of each of the respective word lines WL alternatively to the ground reference voltage GND (in the selected state, for a memory operation of reading or writing/programming) or to a tile supply voltage (in the non-selected state), while the second local buffer element may be configured to implement biasing of each of the respective word lines WL (only) to the ground reference voltage GND (in the selected state). Additionally, the central row decoder 12 may be coupled to respective level shifters 15a that generate control signals for the pass transistors in the local column-decoding units 10, as well as a level shifter local control circuit 15b that produces the pre-decoding signals in the low-voltage domain and sends them to the level shifters.

As exemplified in FIG. 2, the column decoder of the memory device 1 includes a plurality of local column-decoding units 10 (e.g., one for each tile 6), which enable selection and biasing of the local bit lines BL associated to which are the memory cells that are to be read, and their connection to respective sense amplifiers (SAs), configured for comparison of the reading currents of the (direct and complementary) memory cells associated to each bit of the data word. The column decoder of the memory device 1 includes drivers 16 for the local column-decoding units 10 arranged substantially in the area occupied by the local pre-decoding buffers 9a of the architecture of FIG. 1.

In an architecture as exemplified in FIG. 2, the local row decoder buffer stages 14 are implemented with GO2 transistors driven by signals at about 1.8 V (e.g., between 1.5 V and 1.8 V). Therefore, a reduction of the pre-decoding signals routing is achieved with respect to the architecture of FIG. 1 (e.g., by routing 52 low-voltage signals at 0.9 V instead of 112 high-voltage signals at 3.6 V, in the exemplary case of a sector of 256 KB), which advantageously results in a reduction of routing congestion due to the reduced number of signals and the reduced voltage range (0.9 V vs. 3.6 V). The pre-decoding signals at 0.9 V are then elevated (shifted) locally, at the sector level, by the level shifters 15a and level shifter local control circuit 15b, which advantageously results in a reduction of the current consumption due to local elevation and use of GO2 MOS transistors that operate at 1.6 to 1.8 V instead of 3.6 V, thereby possibly avoiding the implementation of a charge pump circuit. Additionally, the architecture of FIG. 2 does not include local pre-decoding buffers 9a for vertical signals, which advantageously allows a better sizing of the drivers 16 for the local column-decoding units 10.

Figure 3:
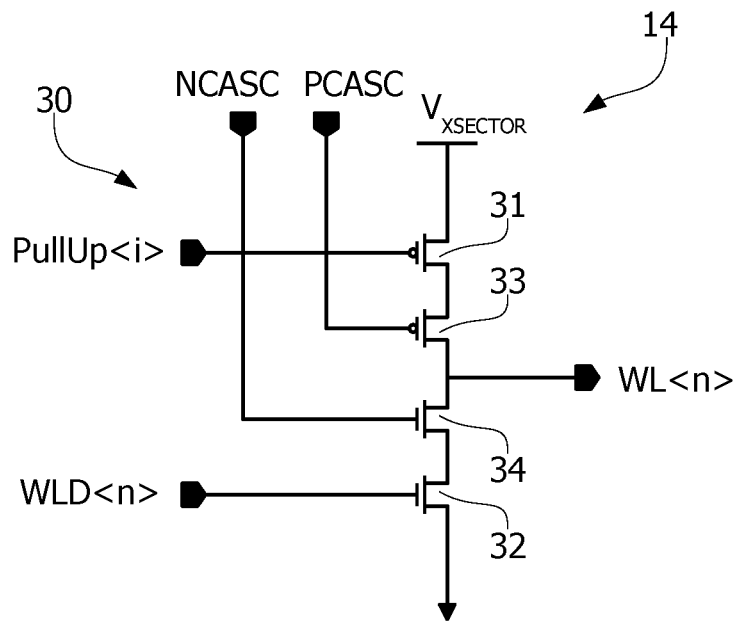
FIG. 3 is a circuit diagram exemplary of a buffer circuit for driving a word line of a memory device.

Therefore, one or more embodiments may rely on the adoption of GO2 p-channel MOS transistors in the local row decoder buffer stages 14, as exemplified in FIG. 3, which is a circuit diagram exemplary of a single buffer circuit 30 for driving a single word line as may be included in a local row decoder buffer stage 14. Buffer 30 may thus include a pull-up PMOS transistor 31 and a pull-down NMOS transistor 32 having their current conduction paths arranged in series between a supply node that provides a buffer supply voltage or tile supply voltage $V_{XSECTOR}$ (e.g., $V_{XSECTOR}=1.8$ V during reading operation, and $V_{XSECTOR}=3.6$ V during writing operation) and a ground node GND that provides a reference ground voltage. Pull-up transistor 31 receives a control signal PullUp<i> at its gate terminal, and pull-down transistor 32 receives a control signal WLD<n> (e.g., a word line selection signal) at its gate terminal. Additionally, a cascode PMOS transistor 33 is coupled in series with transistor 31 and a cascode NMOS transistor 34 is coupled in series with transistor 32. Transistor 33 receives a control signal PCASC at its gate terminal, and transistor 34 receives a control signal NCASC at its gate terminal. A node between intermediate transistors 31 and 32 (e.g., intermediate transistors 33 and 34, as exemplified in FIG. 3) is coupled to a respective word line WL of the tile 6 and drives it via signal WL<n>. Advantageously, transistors 31, 32, 33 and 34 may be optimized for operating in the voltage range of about 1.5 V to 1.8 V (e.g., with good performance down to 1.5 V). The cascoded structure may advantageously protect the buffer MOS switching transistors 31 and 32 during writing operations, when the buffer is supplied by $V_{XSECTOR}=3.6$ V.

Additionally, one or more embodiments may rely on the removal of the local pre-decoding buffers 9a. Control signals for the local row decoder buffer stages 14 may be passed horizontally.

Figure 4:
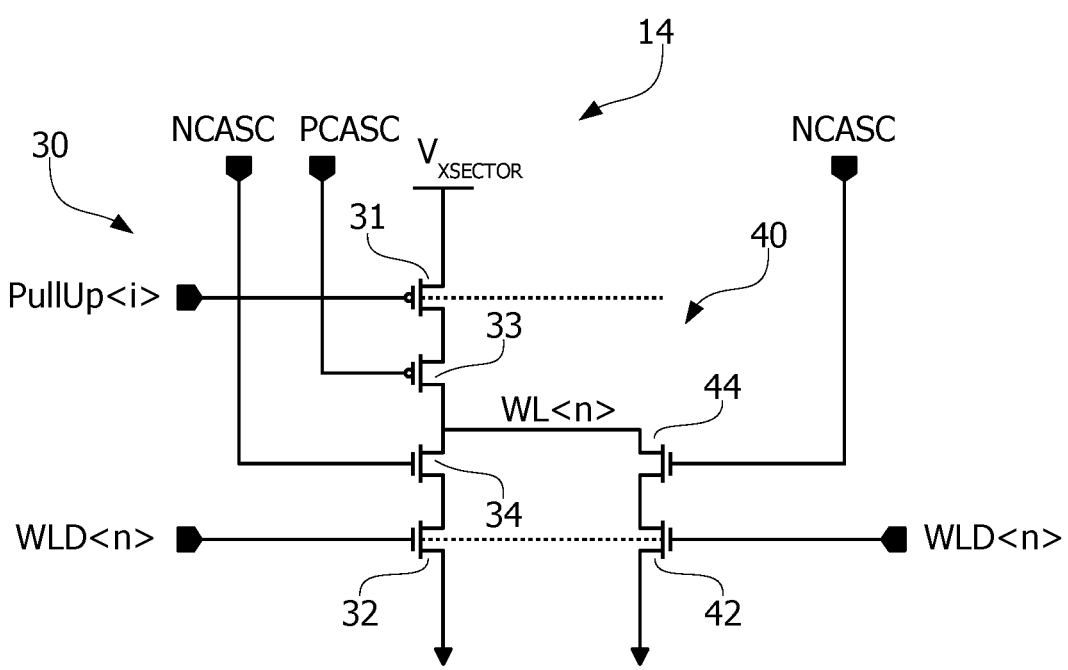
FIG. 4 is a circuit diagram exemplary of another buffer circuit for driving a word line of a memory device.

In particular, one or more embodiments may rely on the architecture exemplified in FIG. 4 for the implementation of local row decoder buffer stages 14. Here, it is shown that each word line WL<n> of a tile 6 may be driven by a first buffer circuit 30 arranged (e.g., horizontally) on one side of the tile and a second buffer circuit 40 arranged (e.g., horizontally) on the other side of the tile. Particularly, buffer 40 may not include any pull-up PMOS transistor, but only a pull-down NMOS transistor 42 that receives at its gate terminal the same control signal WLD<n> as transistor 32 to pull down the word line WL<n>, as well as a cascode NMOS transistor 44 that is coupled in series with transistor 42 and receives control signal NCASC at its gate terminal. Advantageously, also transistors 42 and 44 may be optimized for operating in the voltage range of about 1.5 V to 1.8 V (e.g., with good performance down to 1.5 V).

Figure 5:
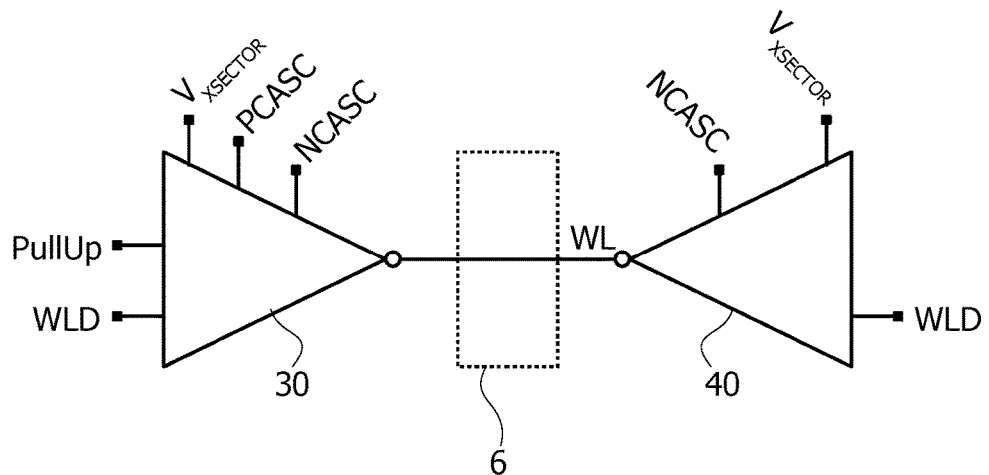
FIG. 5 is a circuit block diagram exemplary of certain details of the architecture of buffer circuits and memory tiles according to one or more embodiments of the present description.
Figure 6:
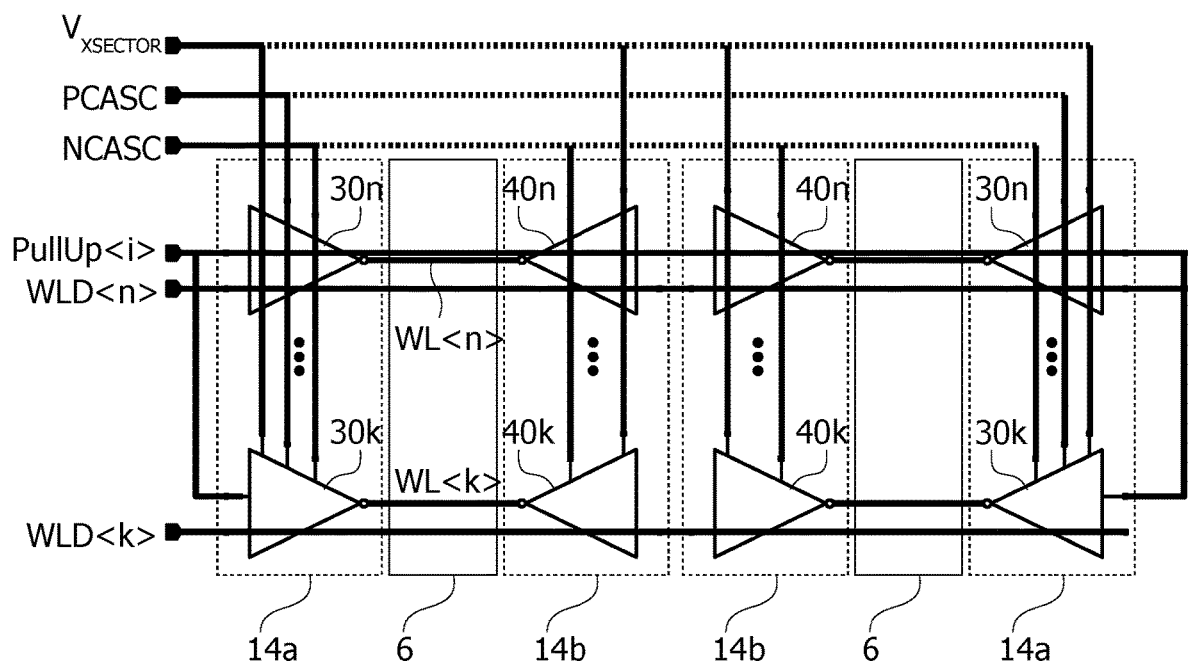
FIG. 6 is a circuit block diagram exemplary of the architecture of plural buffer circuits and plural memory tiles in a memory sector according to one or more embodiments of the present description.

The architecture of FIG. 4 is also reproduced in FIG. 5, where the buffer circuits 30 and 40 are illustrated arranged on opposite sides of a tile 6, and in FIG. 6, where it is shown that a sector of the memory array includes a plurality of tiles 6 arranged horizontally (e.g., each tile including 1024 word lines), and each tile 6 has portions of the respective local row decoder buffer stage 14 arranged on both sides, with a first portion 14a (here shown on the left side of a first tile 6 and on the right side of a second tile 6) including a plurality of buffers 30n, . . . , 30k, and a second portion 14b (here shown on the right side of the first tile 6 and on the left side of the second tile 6) including a plurality of buffers 40n, . . . , 40k, with each pair of buffers 30, 40 driving a respective word line WL<n>, . . . , WL<k>. In particular, some buffers 30 (e.g., 30n, . . . , 30k) in the buffer portion 14a associated to a tile 6 of a same memory sector receive common signals $V_{XSECTOR}$, PCASC, NCASC, PullUp<i> and a dedicated word line selection signal WLD (i.e., WLD<n>, . . . , WLD<k>) to drive a respective word line WL (i.e., WL<n>, . . . , WL<k>) of the sector. Some buffers 40 in the buffer portion 14b associated to a tile 6 of a same memory sector receive common signals $V_{XSECTOR}$, NCASC and the dedicated word line selection signal WLD (i.e., WLD<n>, . . . , WLD<k>) to drive the respective word line WL (i.e., WL<n>, . . . , WL<k>) of the sector. The common signals are thus shared by plural tiles 6 arranged in the same sector (e.g., the common signals may be routed horizontally across multiple tiles). The word line selection signals WLD<n>, . . . , WLD<k> are similarly shared by plural tiles 6 arranged in the same sector (e.g., routed horizontally across multiple tiles).

In one or more embodiments as exemplified herein, it may not be possible to have two separate metal lines for each buffer, resulting in a constraint on the minimum metal pitch. The local row decoder buffer stage 14 can pull-up the word lines by driving the PMOS transistors 31, 33 that share the same gate control signal PullUp<i> for all the buffers 30n, . . . , 30k included in the buffer stage 14a of a certain portion of a sector of the memory. Therefore, the analog signal PullUp<i> drives multiple PMOS transistors not only in the horizontal direction, but also in the vertical (Y) direction, as exemplified in FIG. 6: a weak pull-up when the word line WL<n> is selected (e.g., with a current of few µA), with controlled leakage during selection, and a strong pull-up when the word line WL<n> is unselected, resulting in fast deselection. Therefore, in a memory sector, signals WLD<n>, . . . , WLD<k> are routed horizontally, signals NCASC and PCASC are routed vertically (static signals), and signals PullUp<i> are routed both horizontally and vertically.

Table I reproduced at the end of the description exemplifies the values of the signals $V_{XSECTOR}$, NCASC, PCASC, PullUp<i> and WLD<n> during read and write operations when a certain word line WL<n> is selected or unselected. Voltage $V_{BL}$ may be about 1.6 V and voltage $V_{WRITE}$ may be about 3.6 V.

In particular, during read operations, the switching transistors 31, 32 and 42 do not need to be protected and the respective cascode transistors 33, 34 and 44 may thus be driven so as to let the entire sector supply voltage $V_{XSECTOR}$ drop across transistors 31, 32, 42 (e.g., setting NCASC=$V_{XSECTOR}$=$V_{BL}$ and PCASC=GND=0 V). If the word line is unselected (i.e., at high voltage level), the pull-up transistor 31 may be strongly turned on (e.g., setting PullUp<i>=GND=0 V) and the pull-down transistors 32, 42 may be strongly turned off (e.g., setting WLD<n>=GND=0 V). If the word line is selected (i.e., at low voltage level) the pull-up transistor 31 may be weakly turned on (e.g., setting PullUp<i>=$V_{BL}$−$V_{THP}$) so that a weak current may flow therethrough and the voltage of the word line WL<n> may be determined by the state (on or off) of the pull-down transistors 32, 42. The pull-down transistors 32, 42 may be strongly turned on (e.g., setting WLD<n>=$V_{BL}$=1.6 V). The pull-up signal PullUp<i> is set to a value that keeps the pull-up transistor 31 in a weakly conductive state insofar as the pull-up signal PullUp<i> is shared amongst multiple word line buffers 30 of the memory sector, which may contemporarily be driving unselected word lines, and the pull-up signal PullUp<i> should thus retain its capability of pulling up the unselected word lines.

During write operations, it is beneficial to protect the transistors 31, 32 and 42 and the respective cascode transistors 33, 34 and 44 are thus driven accordingly (e.g., setting NCASC=$V_{WRITE}$/2=1.8 V and PCASC=$V_{WRITE}$/2=1.8 V). If the word line is unselected (i.e., at high voltage level), the pull-up transistor 31 may be strongly turned on (taking into consideration the higher supply voltage $V_{XSECTOR}$, e.g., setting PullUp<i>=$V_{WRITE}$/2=1.8 V) and the pull-down transistors 32, 42 may be strongly turned off (e.g., setting WLD<n>=GND=0 V). If the word line is selected, the pull-up signal PullUp<i> is again set to a value that keeps the pull-up transistor 31 in a weakly conductive state (e.g., setting PullUp<i>=$V_{WRITE}$−$V_{THP}$) in order to be able to pull up the unselected word lines that receive the same signal PullUp<i>. The pull-down transistors 32, 42 may be strongly turned on (taking into consideration the higher supply voltage $V_{XSECTOR}$, e.g., setting WLD<n>=$V_{WRITE}$/2=1.8 V).

Figure 7:
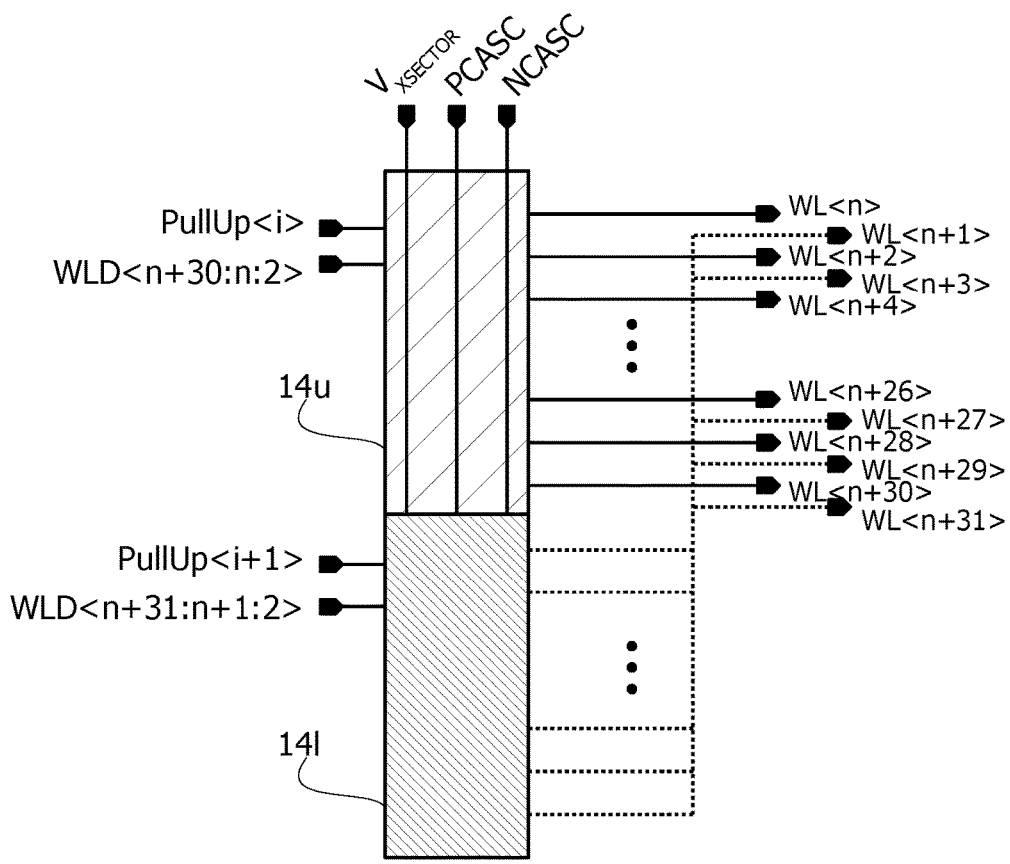
FIG. 7 is a circuit block diagram exemplary of the arrangement of buffer circuits within a buffer stage according to one or more embodiments of the present description.

As exemplified in FIG. 7, in one or more embodiments the buffers 30, 40 of a local row decoder buffer stage 14 may be arranged so that an upper portion 14u of the buffer stage 14 includes the buffers (30 and/or 40) that receive a same pull-up signal PullUp<i> and even-numbered word line selection signals WLD<n+30:n:2> (e.g., sixteen even-numbered driving signals from WLD<0> to WLD<30>) and drive the respective even-numbered word lines (e.g., sixteen even-numbered word lines from WL<n> to WL<n+30>, such as WL<0> to WL<30>), and a lower portion 14l of the buffer stage 14 includes the buffers (30 and/or 40) that receive another same pull-up signal PullUp<i+1> and odd-numbered word line selection signals WLD<n+31:n:2> (e.g., sixteen odd-numbered driving signals from WLD<1> to WLD<31>) and drive the respective odd-numbered word lines (e.g., sixteen odd-numbered word lines from WL<n+1> to WL<n+31>, such as WL<1> to WL<31>). The word lines WL<n> to WL<n+31> are then routed horizontally in an increasing order (e.g., from WL<0> to WL<31>). The buffers 30 in the upper portion 14u of the buffer stage 14 receive the pull-up signal PullUp<i>, and the buffers 30 in the lower portion 14l of the buffer stage 14 receive a different pull-up signal PullUp<i+1>. In other words, the buffers 30 are coupled to alternated word lines, with the even word lines driven by a pull-up signal PullUp<i> and the odd word lines driven by a different pull-up signal PullUp<i+1>. By doing so, the weakly driven unselected word lines can be shielded during reading: when the odd word lines are weakly pulled up, the even word lines are strongly pulled up, and vice versa. Comparing FIG. 6 and FIG. 7, thus, it should be understood that the portion 14a including sixteen buffers 30 that receive the same pull-up signal PullUp<i> may correspond to an upper portion 14u as exemplified in FIG. 7, with the word line selection signals WLD<n> to WLD<k> of FIG. 6 corresponding to signals WLD<n+30:n:2> of FIG. 7. The lower portion 14l visible in FIG. 7 is thus not visible in FIG. 6, for the sake of ease of illustration only. Also, other groups of buffers 14u, 14l may be stacked vertically below those illustrated in FIG. 7 to drive other word lines of the same sector.

Figure 8:
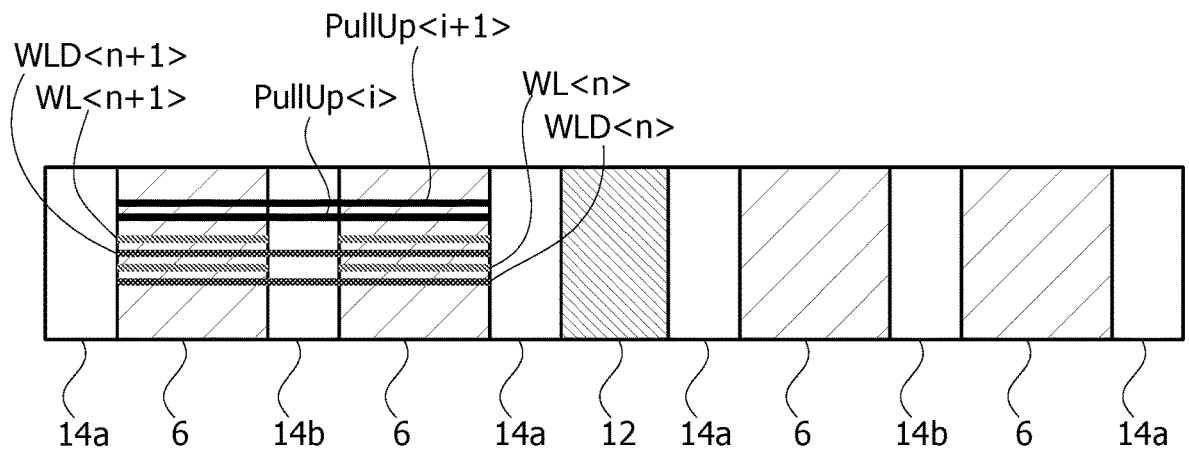
FIG. 8 is a diagram exemplary of the architecture of a memory sector of a non-volatile memory device according to one or more embodiments of the present description.

FIG. 8 is a schematic view exemplary of a sector of a memory device, including tiles 6, local row decoder buffer stages 14a with pull-up transistors, local row decoder buffer stages 14b without pull-up transistors (only pull-down transistors), and a central row decoder 12. In one or more embodiments, the row decoder routing scheme may thus be the following:
  the pull-up signals (e.g., PullUp<i+1>, PullUp<i>) may be routed horizontally through an entire sector of the memory, e.g., using a G1 metal level (e.g., having a width of 0.36 μm and a pitch of 16·0.118 μm=1.888 μm);
  the word line straps (e.g., WL<n> to WL<n+31>) may be routed horizontally within each tile 6, e.g., using an M3/C4 metal level; and
  the word line selection signals (e.g., WLD<n> to WLD<n+31>) may be routed horizontally through an entire sector of the memory, e.g., using a C6 metal level.

Figure 9:
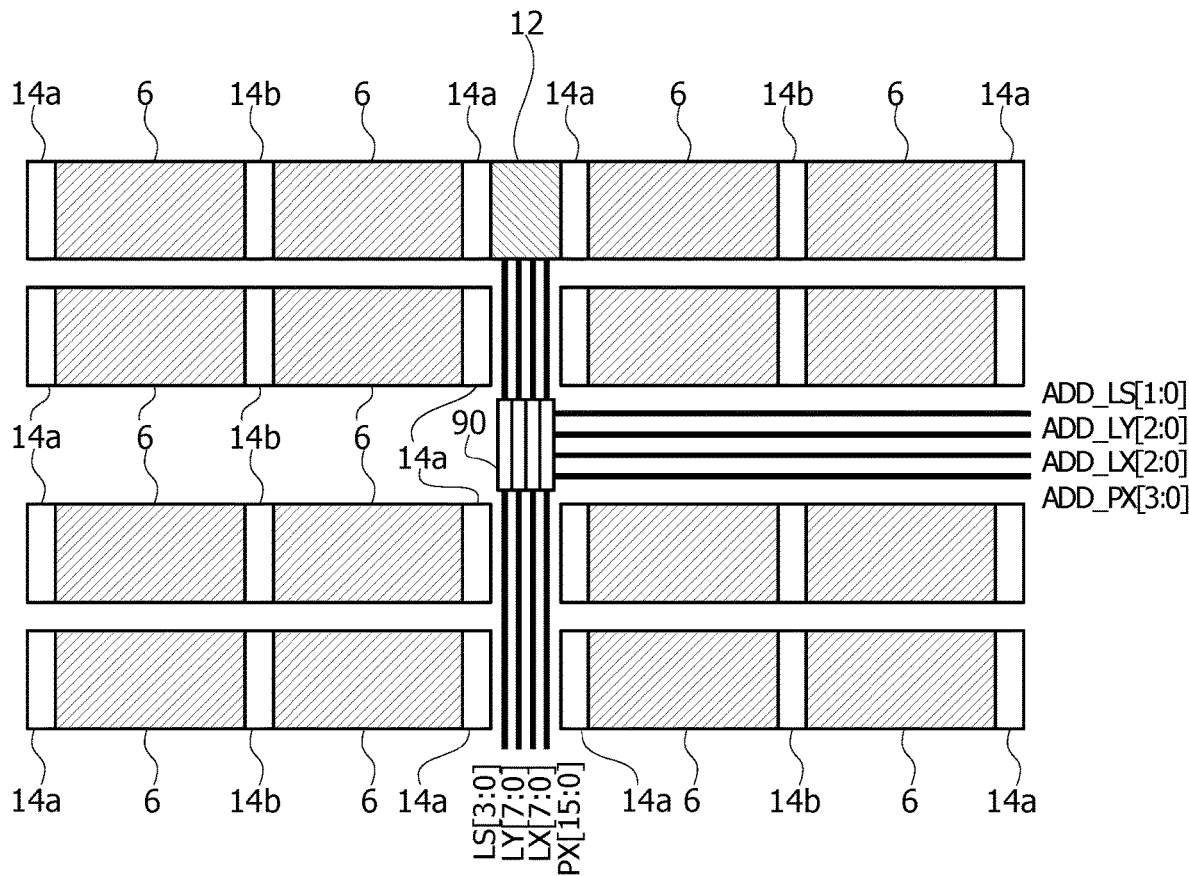
FIG. 9 is a diagram exemplary of the architecture of a non-volatile memory device according to one or more embodiments of the present description, illustrating routing of address signals and pre-decoding signals.

FIG. 9 is a schematic view exemplary of an array of a memory device, including tiles 6 arranged in plural rows (e.g., sectors) and a pre-decoder 90. In particular, FIG. 9 is exemplary of possible horizontal routing of address signals ADD_LS[1:0] (sector selection signal), ADD_LY[2:0], ADD_LX[2:0] and ADD_PX[3:0] (cell selection signals) that are received from an address bus at the pre-decoder 90 (e.g., including an LS decoder, an LY decoder, an LX decoder and a PX decoder). The pre-decoder 90 includes combinatorial networks that produce, starting from the address signals, respective pre-decoding signals LS[3:0], LY[7:0], LX[7:0] and PX[15:0]. The pre-decoding signals are such that only one bit of each group of bits LS[3:0], LY[7:0], LX[7:0] and PX[15:0] is asserted (e.g., set to '1'), depending on the received address. The pre-decoding signals are routed vertically so as to reach different sectors of the memory (arranged in rows), in particular to reach the central row decoders 12 of each sector. Specifically, routing of the address signals may utilize 12 wires (or metal lines), and routing of the pre-decoding signals may utilize 36 wires (or metal lines).

For instance, the address bus may be a 17-bit bus organized as indicated in Table II reproduced at the end of the description.

The bits with the lowest order (F[0] to F[3]) may be used for column decoding (e.g., to produce the column pre-decoding signal YO[15:0]). Ten bits from F[4] to F[13] may be used to decode each row of each sector of the memory (e.g., producing row pre-decoding signals PX[15:0], LX[7:0] and LY[7:0]). Two bits F[14] and F[15] may be used to produce a sector pre-decoding signal LS[3:0]. A last bit F[16] may be used to produce a bank pre-decoding signal LB[1:0]. The bank pre-decoding signal LB[1:0] may select a macro-array of the memory (e.g., a whole array as illustrated in FIG. 9): that is why signal LB [1:0] is not illustrated as an input to the pre-decoder 90, because it would have a fixed value for the entire bank. The sector pre-decoding signal LS[3:0] may select a sector within the bank, i.e., a group of tiles arranged horizontally. Within each sector, each combination of the row pre-decoding signals PX[15:0], LX[7:0] and LY[7:0] selects univocally a row (i.e., a word line) out of the 16*8*8=1024 word lines of the sector. In the central row decoder 12, the pre-decoding signals are level-shifted and logically combined so as to univocally select a word line, as further discussed in the following.

Figure 10:
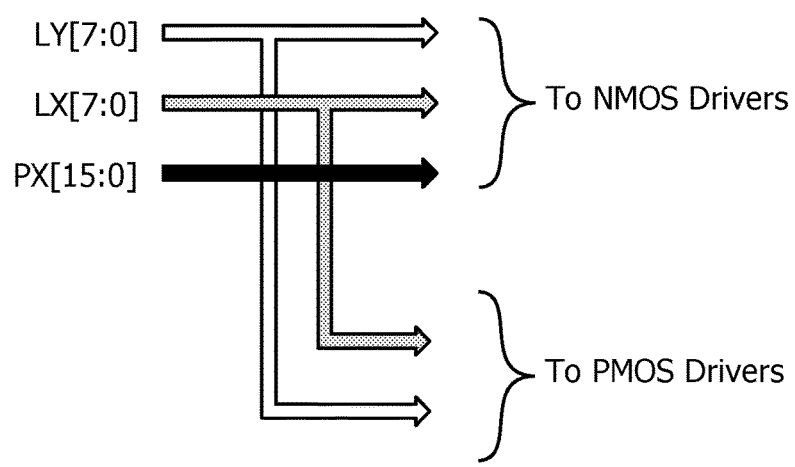
FIG. 10 is a diagram exemplary of routing of pre-decoding signals to drivers of a non-volatile memory device according to one or more embodiments of the present description.

As exemplified in FIG. 10, the pre-decoding signals LY[7:0], LX[7:0] and PX[15:0] are then routed to the NMOS drivers (e.g., to select and drive the corresponding pull-down transistors 32 and 42), while the pre-decoding signals LY[7:0] and LX[7:0] are then routed to the PMOS drivers (e.g., to select and drive the corresponding pull-up transistors 31). The pre-decoding signals PX[15:0] are not used for driving the PMOS drivers insofar as the pull-up signals PullUp<i> are common to a certain number of buffers (e.g., 16 buffers as exemplified in FIG. 6) and therefore the value of signals PullUp<i> is independent from the value of signal PX[15:0]. A dual-voltage domain approach is thus resorted to for local pre-decoding: pre-decoding signals directed to the NMOS drivers are in the range of 0 V to 1.6 V, while pre-decoding signals directed to the PMOS drivers (for pull-up) are in the range of 0 V to 1.6 V during read operation, and in the range of 1.6 V to 3.6 V during write operation.

Figure 11:
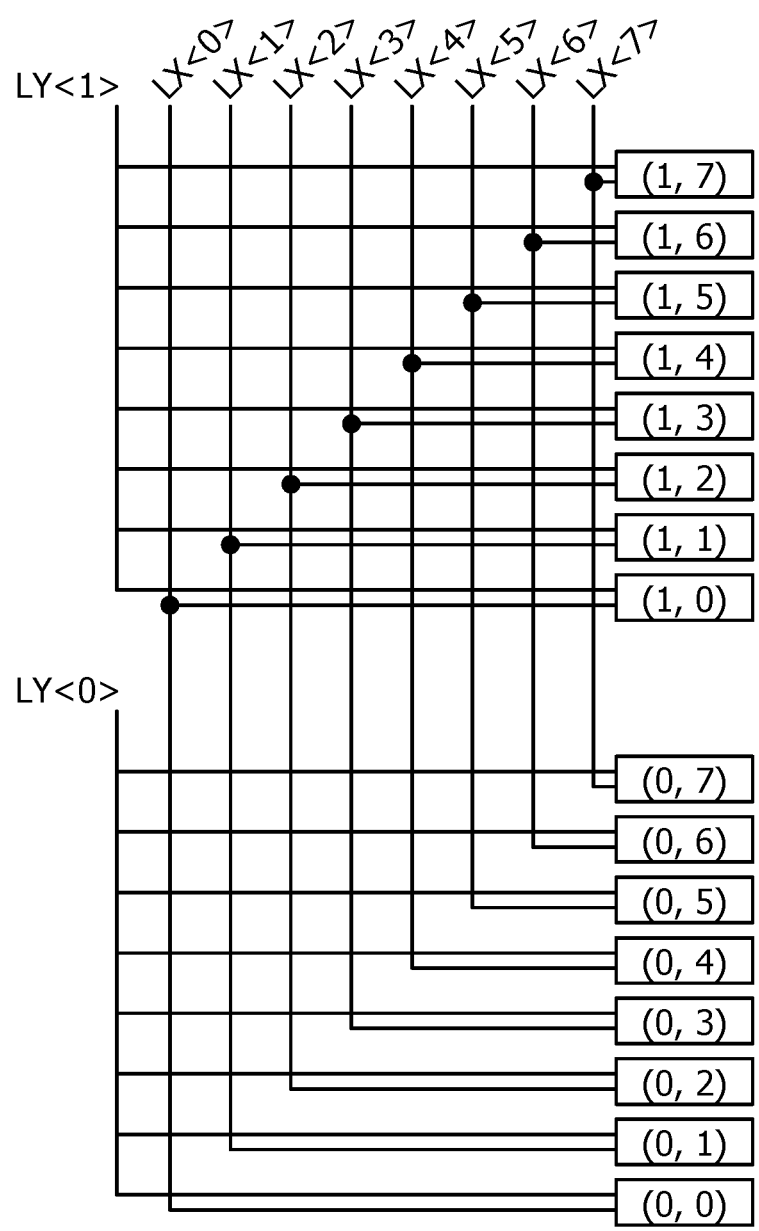
FIG. 11 is a diagram exemplary of possible routing of pre-decoding signals in one or more embodiments of the present description.

FIG. 11 is exemplary of possible handling of pre-decoding signals LY[7:0] and LX[7:0] within a sector. Here, the value of signal LY selects a group of 128 word lines (e.g., from (0, 0) to (0, 7), where each pair (LY<i>, LX<j>) includes 16 word lines); the value of signal LX selects a group of 16 word lines among the 128 word lines selected by signal LY (e.g., group (0, 2)). Therefore, a total of 1024 word lines is managed, divided in 8 groups of 8 groups of 16 word lines each.

Figure 12:
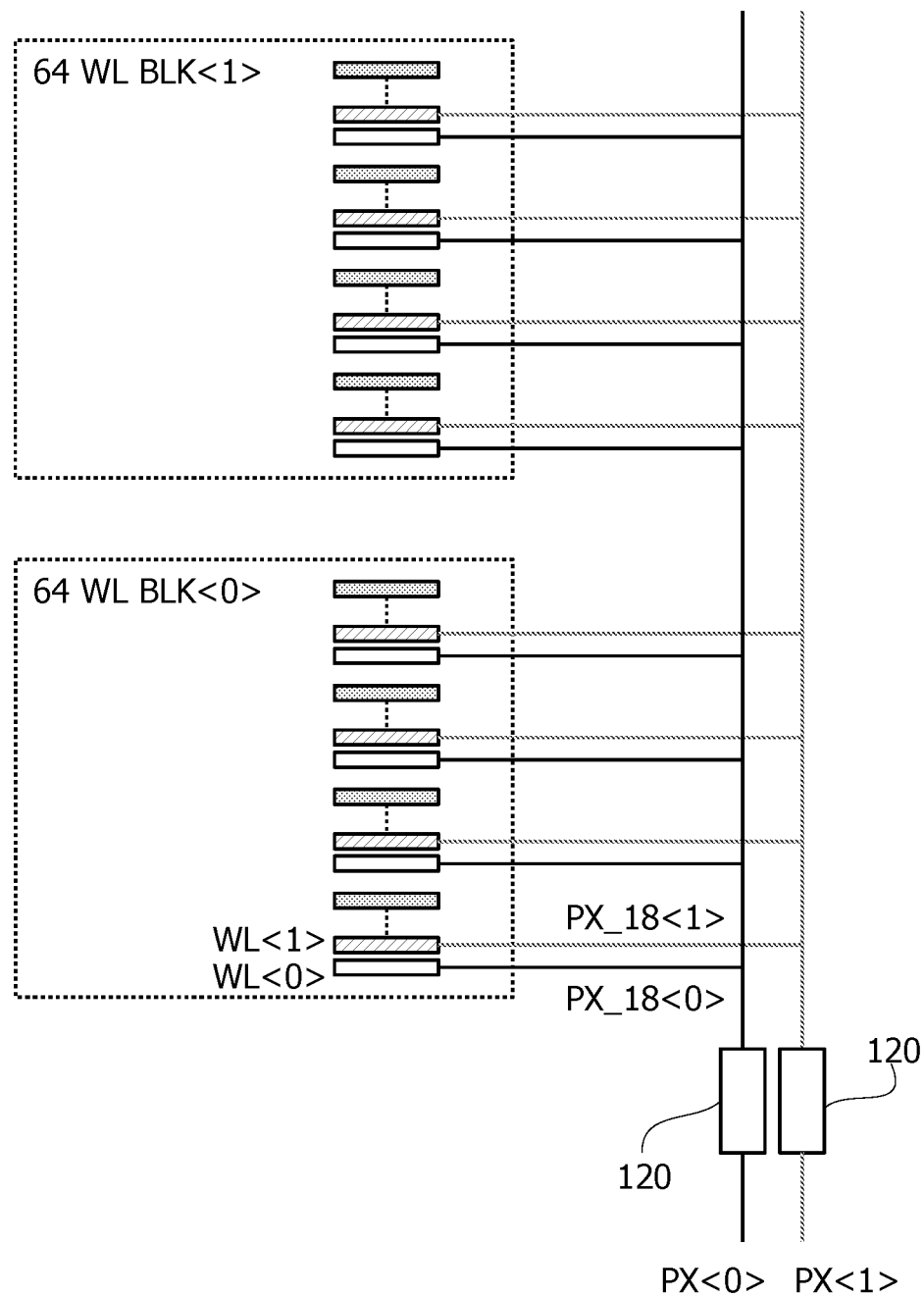
FIG. 12 is a diagram exemplary of possible routing of further pre-decoding signals in one or more embodiments of the present description.

FIG. 12 is exemplary of possible handling of pre-decoding signals PX[15:0] within a sector. Here, the 1024 word lines are ideally divided in 16 blocks (BLK<0> to BLK<15>) of 64 word lines each. Within each block, the 64 word lines are divided in 4 groups of 16 word lines each (i.e., a total of 4*16=64 groups of 16 word lines are ideally present in the sector). The value of signal PX[15:0] selects one of the 16 word lines of each of the 64 groups. In particular, each of the wires of the pre-decoding signal PX[15:0] (e.g., wires PX<0> and PX<1> illustrated in FIG. 12) is propagated to a respective level shifter 120 to produce the corresponding level-shifted signal (e.g., signals PX_18<0> and PX_18<1> illustrated in FIG. 12) in the range of 0 V to 1.8 V. Each of such 16 level-shifted signals PX_18[15:0] is then connected to a total of 64 drivers, all along the height of a memory sector.

Figure 13:
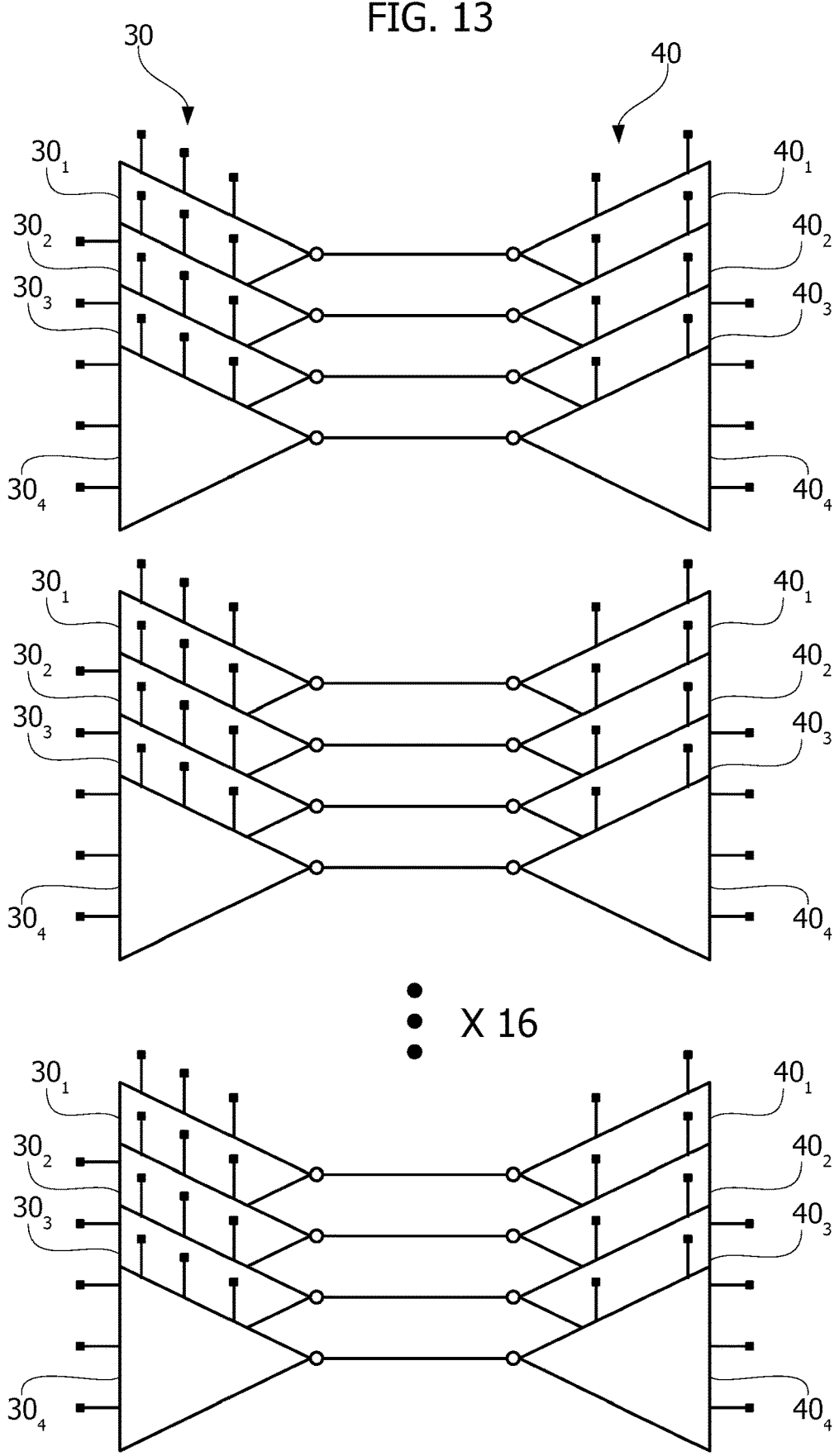
FIG. 13 is a circuit block diagram exemplary of the architecture of plural buffer circuits in a memory sector according to one or more embodiments of the present description.

FIG. 13 is a circuit diagram exemplary of the set of buffers 30 (including pull-down and pull-up structures) and 40 (including only pull-down structures) that are implemented to drive a block of 64 word lines (e.g., one of blocks BLK<0> to BLK<15> of FIG. 12). The buffers are arranged in 16 groups of 4 buffers each: $30_1$ to $30_4$ and $40_1$ to $40_4$. Buffers $30_1$ receive signal PullUp<1>, buffers $30_2$ receive signal PullUp<2>, buffers $30_3$ receive signal PullUp<3>, and buffers $30_4$ receive signal PullUp<4> (repeated in each group). The buffers also receive individual word line selection signals WLD<0> to WLD<63>. In particular, buffers $30_1$ and $40_1$ receive signals WLD<0:60:4>, buffers $30_2$ and $40_2$ receive signals WLD<1:61:4>, buffers $30_3$ and $40_3$ receive signals WLD<2:62:4>, and buffers $30_4$ and $40_4$ receive signals WLD<3:63:4>. Therefore, for each group of 64 word lines, there are:

four pull-up signals PullUp<1> to PullUp<4>, one every 16 word line buffers, that drive the PMOS part of each word line buffer and are generated as a NAND logic combination of signals LX and LY independently from signal PX (see also further below for the generation scheme of signals PullUp<i>); and sixteen NMOS driver parts associated to each pull-up signal PullUp<i>, each NMOS driver part being driven by a word line selection signal WLD that is generated as a NAND logic combination of signals LX, LY and PX (see also further below for the generation scheme of signals WLD).

Figure 14:
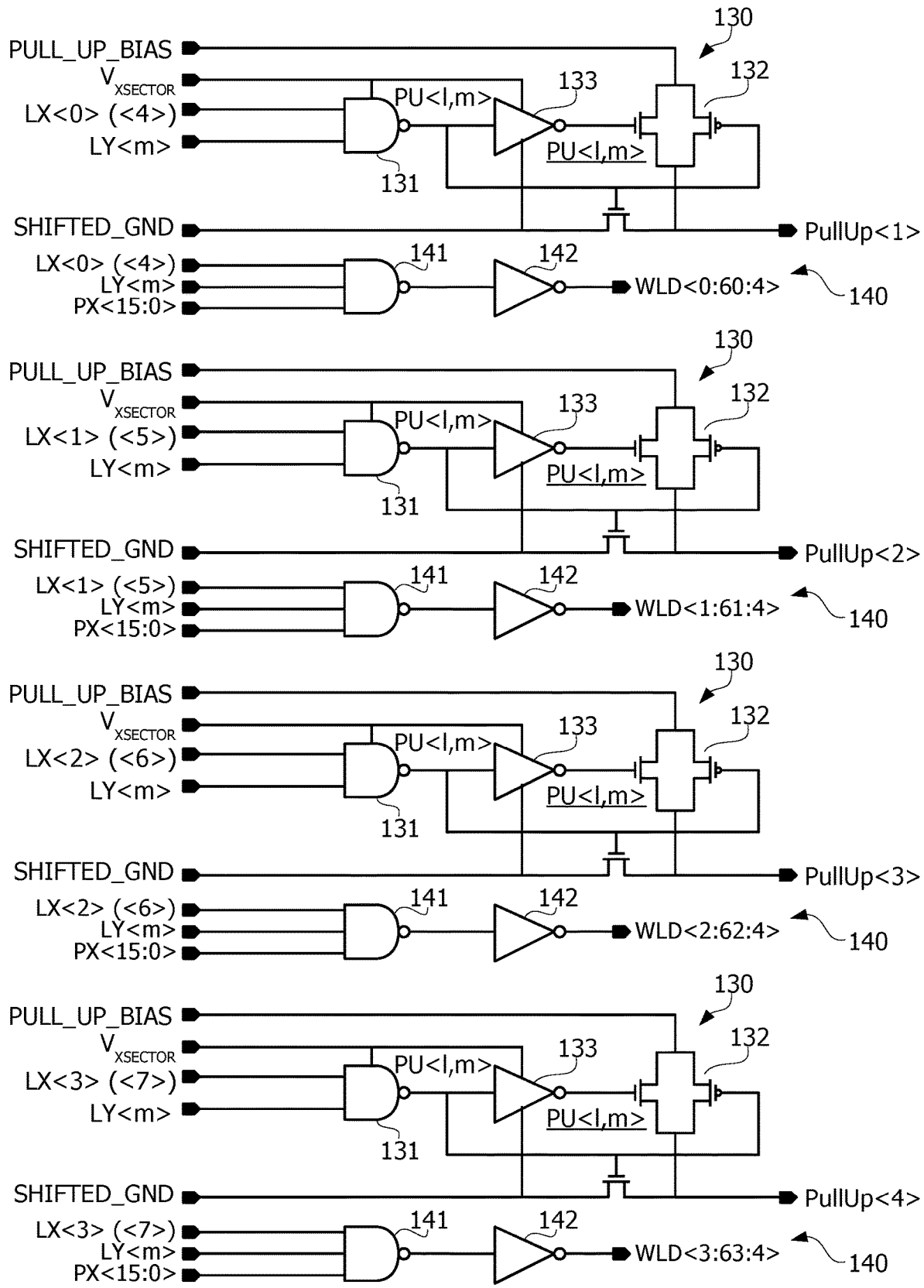
FIGS. 14 to 17 are circuit diagrams exemplary of possible implementation details of a row decoder circuit according to one or more embodiments of the present description.

The driving signals PullUp<1> to PullUp<4> and WLD<0> to WLD<63> may be generated, as a function of the pre-decoding signals LX, LY and PX (as well as LS), resorting to circuit arrangements (e.g., drivers) as exemplified in FIG. 14.

In particular, a driver 130 is configured to generate a pull-up signal PullUp<i> (e.g., PullUp<1>, PullUp<2>, PullUp<3>, PullUp<4>). Driver 130 includes input terminals to receive a pull-up bias voltage PULL_UP_BIAS, a shifted ground voltage SHIFTED_GND, as well as signals $V_{XSECTOR}$, LX<1> and LY<m>. A NAND gate 131 with level shifting function is biased by voltage $V_{XSECTOR}$ and receives input signals LX<1> and LY<m> to produce a pull-up control signal PU<l,m>. The NAND gate 131 may as well receive signal LS, which is not visible in FIG. 14 for the sake of ease of illustration. A transmission gate 132 is configured to pass the bias voltage PULL_UP_BIAS to the output terminal PullUp<i> as a function of the value of the pull-up control signal PU<l,m>. In particular, the transmission gate 132 includes a PMOS transistor having its current conduction path arranged between terminals PULL_UP_BIAS and PullUp<i> and its gate terminal controlled by signal PU<l, m>, and an NMOS transistor having its current conduction path arranged between terminals PULL_UP_BIAS and PullUp<i> and its gate terminal controlled by the complement PU<l,m> of signal PU<l,m>, produced by an inverter 133 that is biased by voltage $V_{XSECTOR}$. Additionally, driver 130 includes an NMOS transistor having its current conduction path arranged between terminals SHIFTED_GND and PullUp<i> and its gate terminal controlled by signal PU<l,m>. Therefore, the pull-up bias voltage PULL_UP_BIAS is passed to the output terminal as signal PullUp<i> if LX<l>=1 and LY<m>=1, while the shifted ground voltage SHIFTED_GND is passed to the output terminal as signal PullUp<i> in the other cases.

In particular, a driver 140 is configured to generate each of the group of sixteen signals WLD. The logic function implemented by each driver 140 is further detailed with reference to FIG. 15. Here, it is shown that each driver 140 includes input terminals to receive one of signals LX (e.g., LX<0>), one of signals LY (e.g., LY<m>) and signals PX<15:0>. A NAND gate 141 with level shifting function is biased by voltage $V_{XSECTOR}$ and receives such input signals to produce the corresponding sixteen signals WLD, together with operation of inverter 142 (operating as a buffer). The NAND gate 141 may as well receive signal LS, which is not visible in FIG. 14 for the sake of ease of illustration. In particular, as exemplified in FIG. 15, each driver 140 may include sixteen three-input NAND logic gates 141. Each of such NAND logic gates receives the same common signals LX<l> and LY<m>, and a dedicated signal PX (e.g., PX<0> is received at the first NAND logic gate down to PX<15> being received at the last NAND logic gate).

Figure 16:
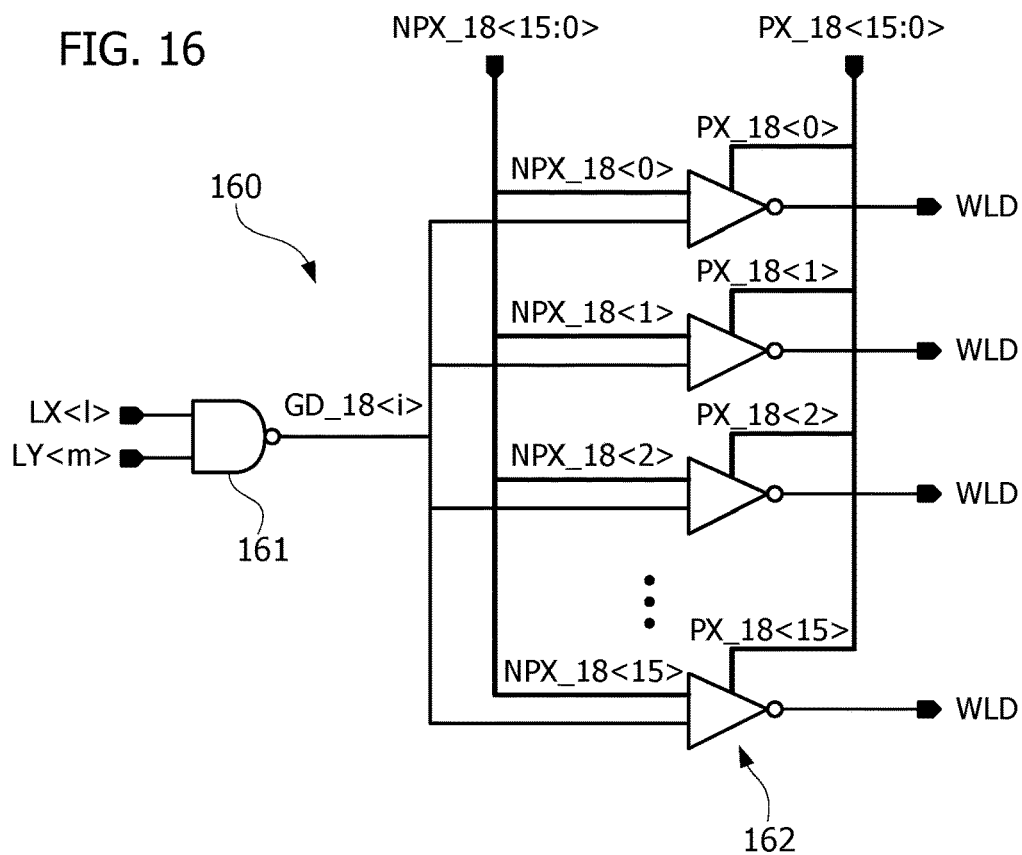

It is noted that the logic function implemented by driver circuit 140 may be implemented by a different driver circuit 160 as exemplified in FIG. 16, with certain advantages. In particular, driver circuit 160 may include a NAND logic gate 161 with level shifting functionality that combines signals LX<l> and LY<m> to produce a level-shifted signal GD_18<i>. Driver circuit 160 may further include sixteen buffers 162 that receive at a first input the common signal GD_18<i>, and at a second input a dedicated signal NPX_18<15:0> (e.g., NPX_18<0> is received at the first inverter 162 and NPX_18<15> is received at the last inverter 162). Each of the sixteen buffers 162 is biased by a dedicated biasing voltage PX_18<15:0> (e.g., signal PX_18<0> biases the first inverter 162 and signal PX_18<15> biases the last inverter 162). Signals PX_18<15:0> are substantially produced by a level shifter (not visible in FIG. 16) that shifts signals PX<15:0> to the 1.8 V voltage range, and signals NPX_18<15:0> substantially correspond to the complements (e.g., inverter replicas) of level-shifted signals PX_18<15:0>.

Figure 17:
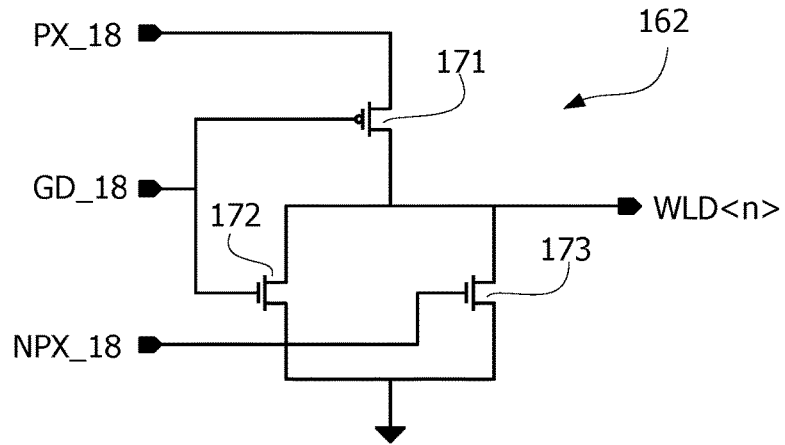

FIG. 17 is a transistor-level circuit diagram that exemplifies the structure of one of the buffers 162 of FIG. 16. Buffer 162 may include:
- a p-channel MOS transistor 171 having a current conduction path arranged between the input terminal (supply terminal) that receives signal PX_18 and the output terminal that provides the word line selection signal WLD<n>, and a gate terminal configured to receive signal GD_18;
- an n-channel MOS transistor 172 having a current conduction path arranged between the output terminal that provides the word line selection signal WLD<n> and the ground terminal, and a gate terminal configured to receive signal GD_18; and
- an n-channel MOS transistor 173 having a current conduction path arranged between the output terminal that provides the word line selection signal WLD<n> and the ground terminal, and a gate terminal configured to receive signal NPX_18.

A single word line may thus be selected as a function of the pre-decoding signals LY, LX and PX insofar as signal GD_18 depends on LX and LY, and signals PX_18 and NPX_18 depend on signal PX. By setting GD_18 to a low level, a group of 16 word lines is selected. Amongst these, a single word line is selected by setting the corresponding signal PX_18 to a high level. Table III reproduced at the end of the description exemplifies the possible logic values of signals GD_18, PX_18 and NPX_18 and their effect on the word line selection signal WLD and on the word line WL.

Figure 15:
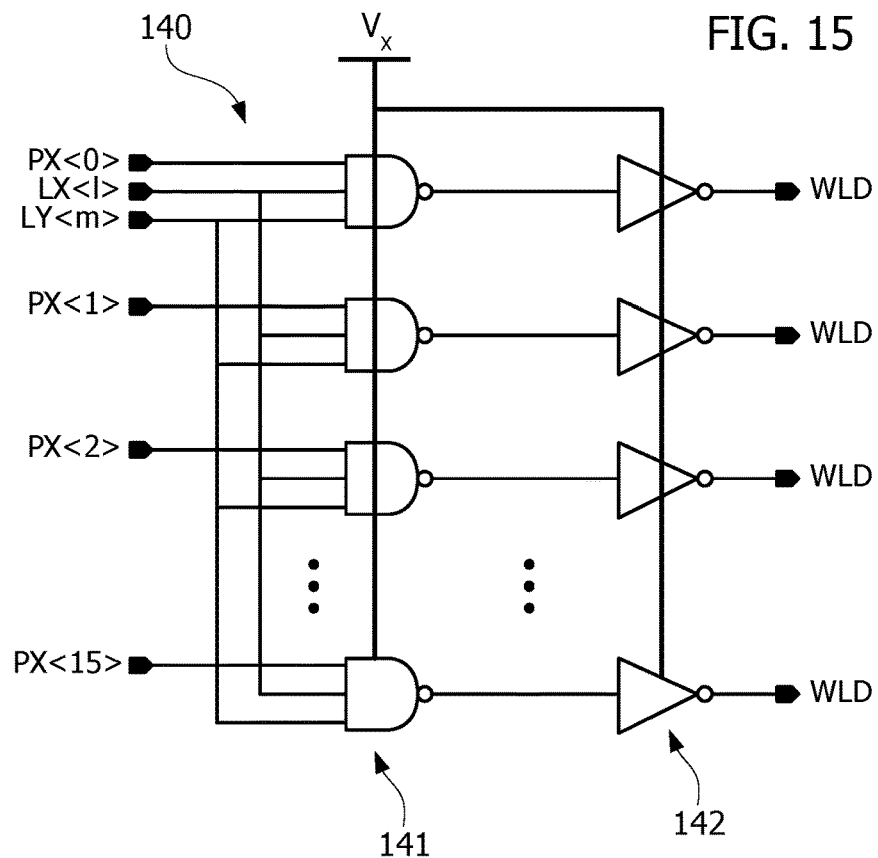

The architecture exemplified in FIGS. 16 and 17 is advantageous compared to the architecture exemplified in FIG. 15 insofar as it reduces the number of NAND gates with level shifter function (e.g., from sixteen NAND gates 141 to a single NAND gate 161). The architecture of FIGS. 16 and 17 uses specially designed buffers 162 in the place of inverters 142 (where each buffer 162 includes one transistor more than each inverter 142) and uses additional inverters to produce the complement signals NPX<0:15>.

Figure 18:
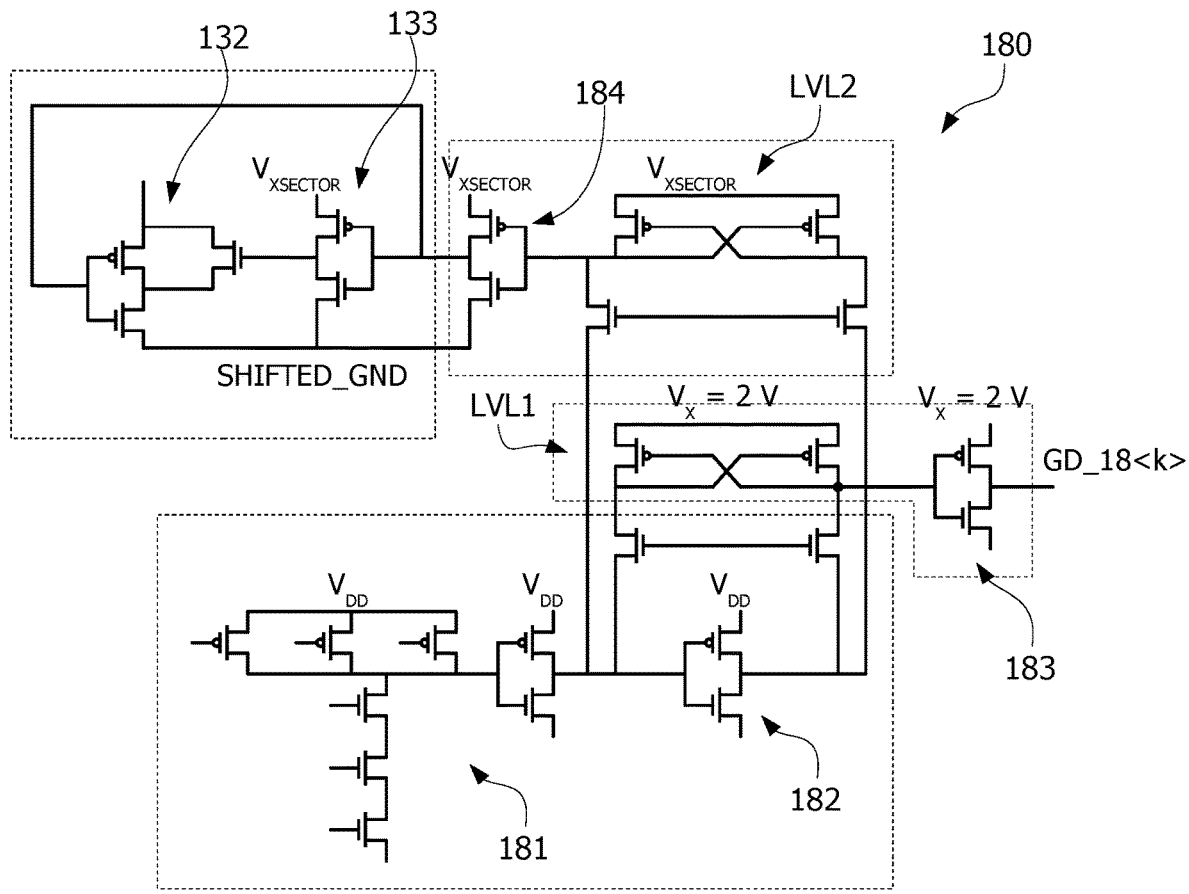
FIGS. 18 to 22 are transistor-level circuit diagrams exemplary of possible implementation details of a row decoder circuit according to one or more embodiments of the present description.
Figure 19:
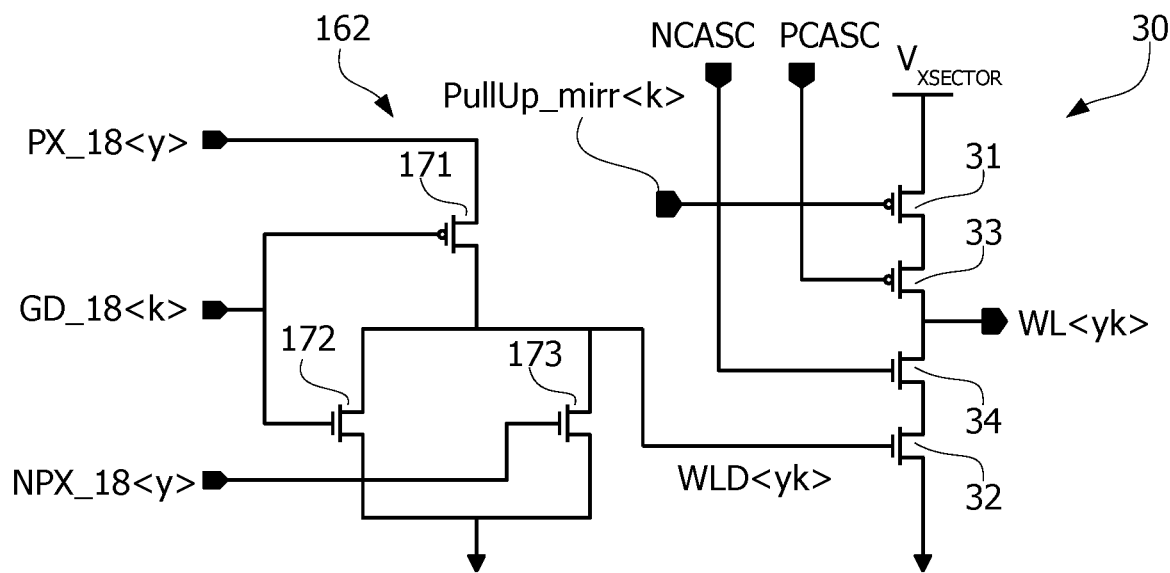

FIG. 18 is a transistor-level circuit diagram that exemplifies a possible implementation of a circuit 180 configured to generate signals PullUp<k> (e.g., a possible implementation of driver circuit 130 of FIG. 14, or in other terms the word line driver PMOS path) and GD_18<k> (e.g., a possible implementation of the NAND level shifter 161 of FIG. 16, or in other terms the first portion of the word line driver NMOS path). In particular, circuit 180 includes a three-input NAND gate 181 that receives input signals LX<l>, LY<m> and LS (the latter one being the sector selection signal, which is not visible as an input to gates 131 and 141 in FIG. 14 for the sake of ease of illustration only). The output of the NAND gate 181 is buffered by an inverter 182. The output of inverter 182 is level shifted by a latched level shifter LVL2 biased at a voltage $V_{XSECTOR}$=3.6 V (in write) or 1.6 V (in read). The output of the level shifter LVL2 is buffered by an inverter 184 to produce signal OUTN. The output signal OUTN of inverter 184 is buffered by inverter 133 (compare to the schemes of FIG. 14), biased between V XSECTOR and SHIFTED_GND, to produce signal OUTP. Signal OUTP produced by inverter 133 is passed to the control terminal of the NMOS transistor of the pass gate 132, while signal OUTN produced by inverter 184 is passed to the control terminal of the PMOS transistor of the pass gate 132. The output of inverter 182 is level shifted by a latched level shifter arrangement LVL1 biased at a voltage $V_x$=2 V or $V_x$=1.8 V. The output of the level shifter LVL1 is buffered by an inverter 183 to produce signal GD_18<k> as a function of LX<l>, LY<m> and LS. Therefore, the combination of NAND gate 181 with inverter 182, level shifter LVL2 and inverter 184 plays the function of the level-shifting NAND gate 131 of FIG. 14. Similarly, the combination of NAND gate 181 with inverter 182, level shifter LVL1 and inverter 183 plays the function of the level-shifting NAND gate 141 of FIG. 14. The additional circuitry coupled at the output of inverter 133 produces the pull-up signal PullUp<k> and closes the word line driver PMOS path for driving transistors 31 (see FIG. 4). The additional circuitry 162 and driver 30 coupled at the output of inverter 183 as exemplified in FIG. 19 133 produces the pull-down signal WLD<yk> and closes the word line driver NMOS path for driving transistors 32 (see FIG. 4). The circuitry illustrated in FIG. 18 may be instantiated 4 times in a sector (e.g., to produce four different pull-up signals PullUp, as discussed with reference to FIG. 13). The circuitry illustrated in FIG. 19 is instantiated as many times as are word lines in the memory array/sector (e.g., 1024 times).

Figure 20:
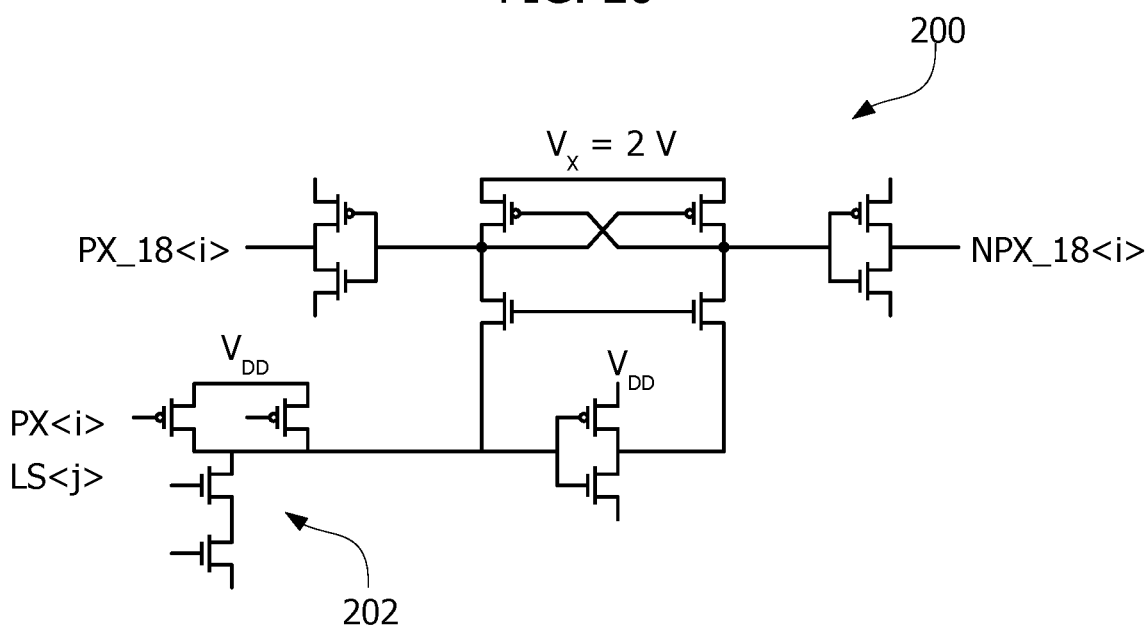
Figure 21:
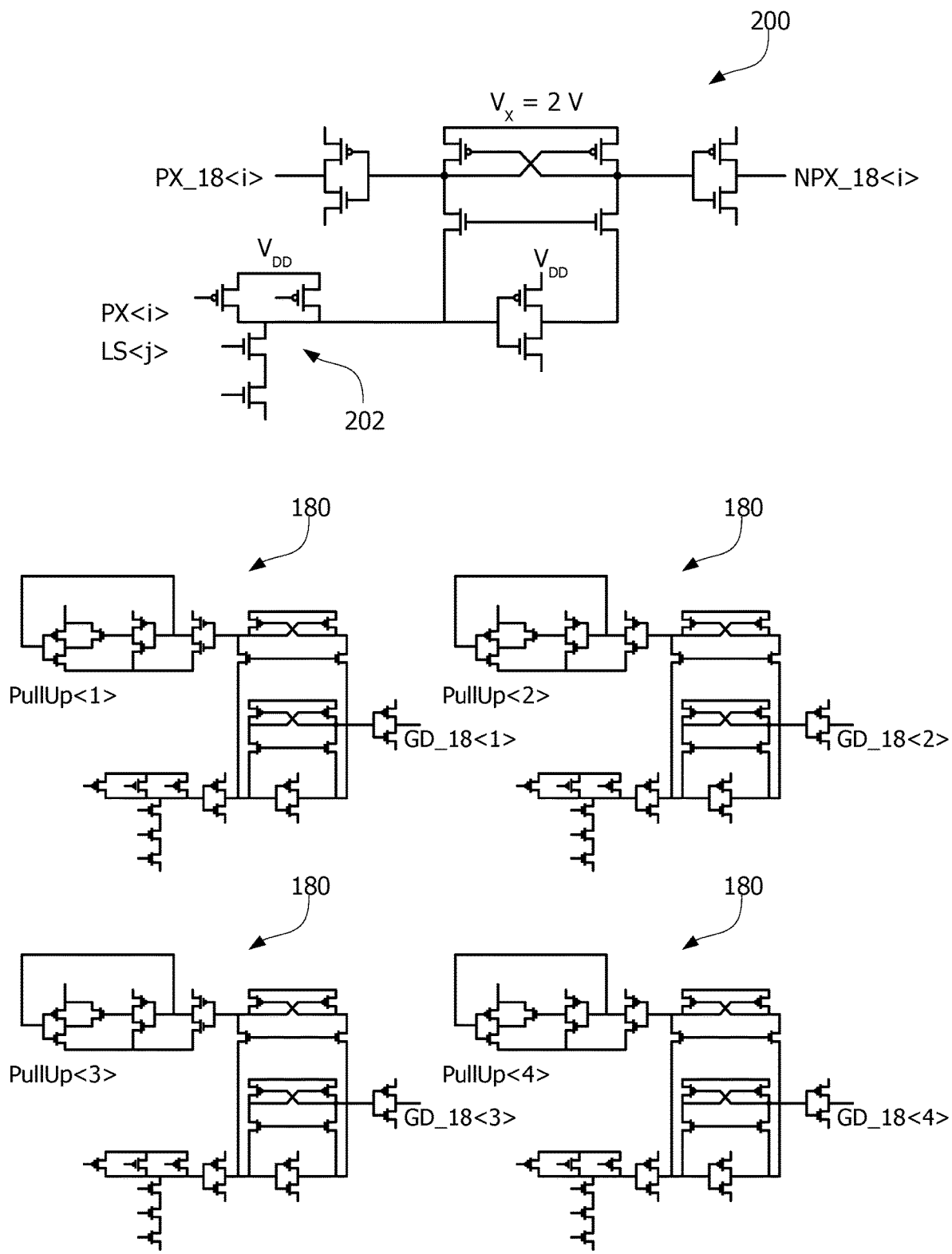
Figure 22:
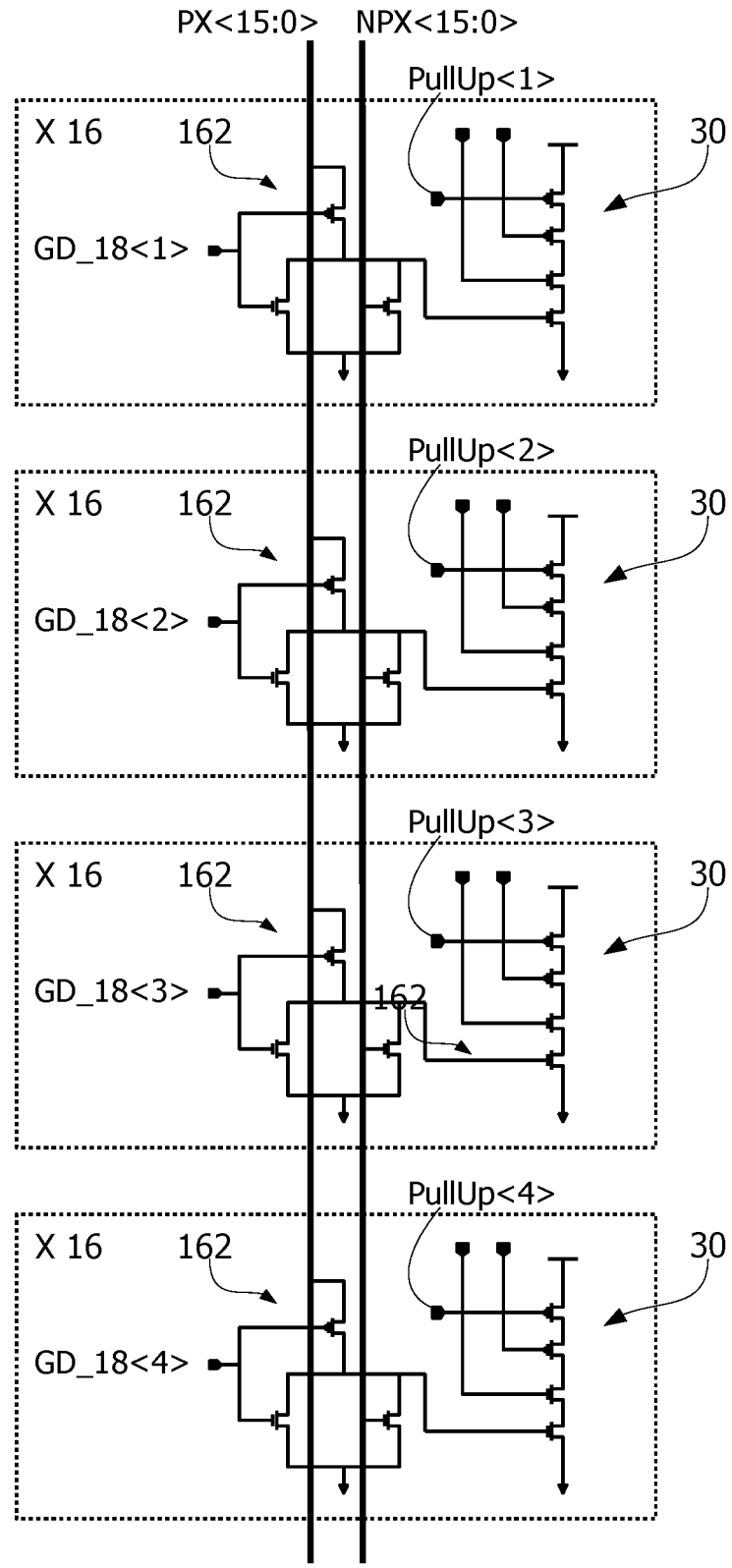

FIG. 20 is a transistor-level circuit diagram exemplary of implementation of a circuit 200 configured to generate signals PX_18<y> and NPX_18<y>. One circuit 200 may be instantiated every four circuits 180 (e.g., sixteen instances), as exemplified in FIG. 21. Four instances of circuit 180 produce the respective signals PullUp<1> and GD_18<1> (first instance), PullUp<2> and GD_18<2> (second instance), PullUp<3> and GD_18<3> (third instance), and PullUp<4> and GD_18<4> (fourth instance). The input signals to the NAND gate 202 are PX<i> and LS<j> (where j=3, . . . , 0) coming from the pre-decoder 90. One instance of circuit 200 produces the signals PX_18<i> and NPX_18<i>. The overall architecture exemplified in FIG. 21 is then repeated sixteen times, thereby generating 64*16=1024 outputs, and 16 signals PX_18 and NPX_18, as exemplified in FIG. 22, where signals PX<15:0> and NPX<15:0> are routed vertically through four groups of sixteen driver instances.

Without prejudice to the underlying principles, the details and embodiments may vary, even significantly, with respect to what has been described by way of example only, without departing from the extent of protection.

TABLE I

| WL<n> | Read | | Write | |
|---|---|---|---|---|
| | Selected | Unselected | Selected | Unselected |
| $V_{XSECTOR}$ | $V_{BL}$ (1.6 V) | $V_{BL}$ (1.6 V) | $V_{WRITE}$ (3.6 V) | $V_{WRITE}$ (3.6 V) |
| NCASC | $V_{BL}$ (1.6 V) | $V_{BL}$ (1.6 V) | $V_{WRITE}/2$ | $V_{WRITE}/2$ |
| PCASC | 0 V | 0 V | $V_{WRITE}/2$ | $V_{WRITE}/2$ |
| PullUp<i> | $V_{BL} - V_{THP}$ | 0 V | $V_{WRITE} - V_{THP}$ | $V_{WRITE}/2$ |
| WLD<n> | $V_{BL}$ (1.6 V) | 0 V | $V_{WRITE}/2$ | 0 V |

TABLE II

| F16 | F15 | F14 | F13 | F12 | F11 | F10 | F9 | F8 | F7 | F6 | F5 | F4 | F3 | F2 | F1 | F0 |
|---|---|---|---|---|---|---|---|---|---|---|---|---|---|---|---|---|
| LB[1:0] | | LS[3:0] | | | LY[7:0] | | | | | LX[7:0] | | | | PX[15:0] | | YO[15:0] |

TABLE III

| GD_18 | PX_18 | NPX_18 | WLD | WL |
|---|---|---|---|---|
| 0 | 0 | 1 | Low | High (unselected) |
| 0 | 1 | 0 | High | Low (selected) |
| 1 | 0 | 1 | Low | High (unselected) |
| 1 | 1 | 0 | Low | High (unselected) |

A non-volatile memory device (1), may be summarized as including at least one memory sector, wherein each memory sector includes a plurality of tiles (6) arranged horizontally, wherein each tile of the plurality of tiles (6) includes a plurality of memory cells arranged in an array of word lines extending horizontally and bit lines extending vertically, wherein the memory cells of a same row are coupled to a same word line and the memory cells of a same column are coupled to a same bit line; a pre-decoder (90) configured to receive a set of encoded address signals (ADD_LS[1:0], ADD_LY[2:0], ADD_LX[2:0], ADD_PX[3:0]) and including a combinatorial circuit configured to produce pre-decoding signals (LS[3:0], LY[7:0], LX[7:0], PX[15:0]) as a function of said encoded address signals, wherein a combination of values of said pre-decoding signals identifies one word line within said at least one memory sector; a central row decoder (12) arranged in line with said plurality of tiles (6) of said at least one memory sector, wherein the central row decoder (12) is configured to receive said pre-decoding signals (LS[3:0], LY[7:0], LX[7:0], PX[15:0]), and process said pre-decoding signals to produce level-shifted pull-up driving signals (PullUp<i>) and level-shifted pull-down driving signals (WLD<n>) for driving said word lines to a selected state or an unselected state; a respective first set (14a) of first buffer circuits (30) arranged on a first side of each of said tiles (6) of the plurality of tiles (6), wherein each of said first buffer circuits (30) is coupled to a respective word line of the tile (6) and is configured to: receive a level-shifted pull-up driving signal out of said level-shifted pull-up driving signals (PullUp<i>) and receive a level-shifted pull-down driving signal (WLD<n>) out of said level-shifted pull-down driving signals (WLD<n>); and selectively pull-up (31, 33, PullUp<i>, $V_{XSECTOR}$) or pull-down (32, 34, WLD<n>) said respective word line as a function of the values of said received level-shifted pull-up driving signal and level-shifted pull-down driving signal; a respective second set (14b) of second buffer circuits (40) arranged on a second side of each of said tiles (6) of the plurality of tiles (6), wherein each of said second buffer circuits (40) is coupled to a respective word line of the tile (6) and is configured to: receive a level-shifted pull-down driving signal (WLD<n>) out of said level-shifted pull-down driving signals (WLD<n>); and selectively pull-down (32, 34, WLD<n>) said respective word line as a function of the value of said received level-shifted pull-down driving signal; wherein said pre-decoding signals (LS[3:0], LY[7:0], LX[7:0], PX[15:0]) are in the voltage range of 0 V to about 0.9 V, and said level-shifted pull-up driving signals (PullUp<i>) and level-shifted pull-down driving signals (WLD<n>) are in the voltage range of 0 V to a tile supply voltage ($V_{XSECTOR}$) of said at least one memory sector.

Each of said first buffer circuits (30) may include a pull-up p-channel MOS transistor (31) and a p-channel cascode transistor (33) having their current paths arranged in series between a tile supply voltage node that provides said tile supply voltage ($V_{XSECTOR}$) and the respective word line (WL<n>) of the first buffer circuit (30), wherein a gate terminal of said pull-up p-channel MOS transistor (31) receives said level-shifted pull-up driving signal (PullUp<i>) and a gate terminal of said p-channel cascode transistor (33) receives a pull-up cascode control signal (PCASC); and each of said first buffer circuits (30) may include a pull-down n-channel MOS transistor (32) and an n-channel cascode transistor (34) having their current paths arranged in series between the respective word line (WL<n>) of the first buffer circuit (30) and a ground voltage node that provides a ground voltage, wherein a gate terminal of said pull-down n-channel MOS transistor (32) receives said level-shifted pull-down driving signal (WLD<n>) and a gate terminal of said n-channel cascode transistor (34) receives a pull-down cascode control signal (NCASC); each of said second buffer circuits (40) may include a further pull-down n-channel MOS transistor (42) and a further n-channel cascode transistor (44) having their current paths arranged in series between the respective word line (WL<n>) of the second buffer circuit (40) and said ground voltage node, wherein a gate terminal of said further pull-down n-channel MOS transistor (42) receives said level-shifted pull-down driving signal (WLD<n>) and a gate terminal of said further n-channel cascode transistor (44) receives said pull-down cascode control signal (NCASC).

During read operation, said tile supply voltage ($V_{XSECTOR}$) may be set to a value ($V_{BL}$) in the range of 1.5 V to 1.8 V, said pull-down cascode control signal (NCASC) may be set to a value equal to said tile supply voltage ($V_{XSECTOR}$), said pull-up cascode control signal (PCASC) may be set to a value equal to said ground voltage, said level-shifted pull-down driving signal (WLD<n>) may be set to a value equal to said tile supply voltage ($V_{XSECTOR}$) to select the respective word line (WL<n>) or to a value equal to said ground voltage to deselect the respective word line (WL<n>), and said level-shifted pull-up driving signal (PullUp<i>) may be set to a value equal to said tile supply voltage ($V_{XSECTOR}$) minus a threshold ($V_{THP}$) to select the respective word line (WL<n>) or to a value equal to said ground voltage to deselect the respective word line (WL<n>); and during write operation, said tile supply voltage ($V_{XSECTOR}$) may be set to a value ($V_{WRITE}$) in the range of 3.5 V to 4.5 V, said pull-down cascode control signal (NCASC) may be set to a value equal to half of said tile supply voltage ($V_{XSECTOR}$), said pull-up cascode control signal (PCASC) may be set to a value equal to half of said tile supply voltage ($V_{XSECTOR}$), said level-shifted pull-down driving signal (WLD<n>) may be set to a value equal to half of said tile supply voltage ($V_{XSECTOR}$) to select the respective word line (WL<n>) or to a value equal to said ground voltage to deselect the respective word line (WL<n>), and said level-shifted pull-up driving signal (PullUp<i>) may be set to a value equal to said tile supply voltage ($V_{XSECTOR}$) minus a threshold ($V_{THP}$) to select the respective word line (WL<n>) or to a value equal to half of said tile supply voltage ($V_{XSECTOR}$) to deselect the respective word line (WL<n>).

Said tile supply voltage ($V_{XSECTOR}$), said pull-up cascode control signal (PCASC) and said pull-down cascode control signal (NCASC) may be routed vertically within said at least one memory sector; said level-shifted pull-down driving signals (WLD<n>) may be routed horizontally within said at least one memory sector towards said first buffer circuits (30) and said second buffer circuits (40) that drive a same word line (WL<n>); and said level-shifted pull-up driving signals (PullUp<i>) may be routed both vertically and horizontally within said at least one memory sector towards groups of said first buffer circuits (30) that drive groups of word lines (WL<n>, WL<k>).

Said first buffer circuits (30) in said first set (14*a*) of first buffer circuits (30) may be arranged in at least a first subset (14*u*) and a second subset (141), the first (14*u*) and second (141) subset being spatially contiguous in the vertical direction; the first buffer circuits (30) in the first subset (14*u*) may receive a same level-shifted pull-up driving signal (PullUp<i>) and may be configured to drive a respective first subset of word lines (WL<n>, WL<n+2>, WL<n+4>, . . . , WL<n+26>, WL<n+28>, WL<n+30>) of the tile (6); the first buffer circuits (30) in the second subset (141) may receive a same level-shifted pull-up driving signal (PullUp<i+1>) different from the level-shifted pull-up driving signal (PullUp<i>) received by the first buffer circuits (30) in the first subset (14*u*), and may be configured to drive a respective second subset of word lines (WL<n+1>, WL<n+3>, WL<n+5>, . . . , WL<n+27>, WL<n+29>, WL<n+31>) of the tile (6); wherein the word lines of said first subset may be interleaved with the word lines of said second subset.

Said central row decoder (12) may include a plurality of pull-up driver circuits (130); each of said pull-up driver circuits (130) may be configured to receive a respective first pre-decoding signal (LS[3:0]), a respective second pre-decoding signal (LX<0>, LX<1>, LX<2>, LX<3>, LX<4>, LX<5>, LX<6>, LX<7>) and a respective third pre-decoding signal (LY<m>); each of said pull-up driver circuits (130) may include a level-shifting NAND logic gate (131) configured to receive as input said respective first, second and third pre-decoding signals to assert and de-assert a respective pull-up control signal (PU<l,m>); each of said pull-up driver circuits (130) may be configured to produce a respective level-shifted pull-up driving signal (PullUp<1>, PullUp<2>, PullUp<3>, PullUp<4>) by passing to its output a pull-up bias voltage (PULL_UP_BIAS) in response to said respective pull-up control signal (PU<l,m>) being de-asserted, and a shifted ground voltage (SHIFTED_GND) in response to said respective pull-up control signal (PU<l,m>) being asserted.

Said central row decoder (12) may include a plurality of pull-down driver circuits (160); each of said pull-up driver circuits (160) may be configured to receive a respective first pre-decoding signal (LS[3:0]), a respective second pre-decoding signal (LX<1>) and a respective third pre-decoding signal (LY<m>); each of said pull-up driver circuits (160) may include a level-shifting NAND logic gate (161) configured to receive as input said respective first, second and third pre-decoding signals to assert and de-assert a respective pull-down control signal (GD_18<i>); each of said pull-up driver circuits (160) may include a plurality of buffer arrangements (162), wherein each of said buffer arrangements (162) is configured to receive as input said respective pull-down control signal (GD_18<i>), a respective fourth pre-decoding signal (PX_18<15:0>) and the complement of said fourth pre-decoding signal (NPX_18<15:0>), wherein each of said buffer arrangements (162) may be configured to produce a respective level-shifted pull-down driving signal (WLD) by passing to its output said respective fourth pre-decoding signal (PX_18) in response to said respective pull-down control signal (GD_18) being de-asserted, and said ground voltage in response to said respective pull-down control signal (GD_18) being asserted or said complement of said fourth pre-decoding signal (NPX_18) being asserted.

A method of operating a non-volatile memory device (1) may be summarized as including receiving, at said pre-decoder (90), a set of encoded address signals (ADD_LS[1:0], ADD_LY[2:0], ADD_LX[2:0], ADD_PX[3:0]) and producing pre-decoding signals (LS[3:0], LY[7:0], LX[7:0], PX[15:0]) as a function of said encoded address signals, wherein a combination of values of said pre-decoding signals identifies one word line within said at least one memory sector; receiving, at said central row decoder (12), said pre-decoding signals (LS[3:0], LY[7:0], LX[7:0], PX[15:0]) and processing said pre-decoding signals to produce level-shifted pull-up driving signals (PullUp<i>) and level-shifted pull-down driving signals (WLD<n>) for driving said word lines to a selected state or an unselected state; receiving, at each of said first buffer circuits (30), a level-shifted pull-up driving signal out of said level-shifted pull-up driving signals (PullUp<i>) and a level-shifted pull-down driving signal (WLD<n>) out of said level-shifted pull-down driving signals (WLD<n>); selectively pulling-up (31, 33, PullUp<i>, $V_{XSECTOR}$) or pulling-down (32, 34, WLD<n>) said respective word line, via each of said first buffer circuits (30), as a function of the values of said level-shifted pull-up driving signal and level-shifted pull-down driving signal received at each of said first buffer circuits (30); receiving, at each of said second buffer circuits (40), a level-shifted pull-down driving signal (WLD<n>) out of said level-shifted pull-down driving signals (WLD<n>); selectively pulling-down (32, 34, WLD<n>) said respective word line, via each of said second buffer circuits (40), as a function of the value of said level-shifted pull-down driving signal received at each of said second buffer circuits (40); wherein said pre-decoding signals (LS[3:0], LY[7:0], LX[7:0], PX[15:0]) are in the voltage range of 0 V to about 0.9 V, and said level-shifted pull-up driving signals (PullUp<i>) and level-shifted pull-down driving signals (WLD<n>) are in the voltage range of 0 V to a tile supply voltage ($V_{XSECTOR}$) of said at least one memory sector.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A non-volatile memory device, comprising:
   at least one memory sector, wherein each memory sector includes a plurality of tiles arranged horizontally, wherein each tile of the plurality of tiles includes a plurality of memory cells arranged in an array of word lines extending horizontally and bit lines extending vertically, wherein the memory cells of a same row are coupled to a same word line and the memory cells of a same column are coupled to a same bit line;
   a pre-decoder configured to receive a set of encoded address signals and including a combinatorial circuit configured to produce pre-decoding signals as a function of said encoded address signals, wherein a combination of values of said pre-decoding signals identifies one word line within said at least one memory sector;
   a central row decoder arranged in line with said plurality of tiles of said at least one memory sector, wherein the central row decoder is configured to receive said pre-decoding signals, and process said pre-decoding signals to produce level-shifted pull-up driving signals and level-shifted pull-down driving signals for driving said word lines to a selected state or an unselected state;

a respective first set of first buffer circuits arranged on a first side of each of said tiles of the plurality of tiles, wherein each of said first buffer circuits is coupled to a respective word line of the tile and is configured to:
receive a level-shifted pull-up driving signal out of said level-shifted pull-up driving signals and receive a level-shifted pull-down driving signal out of said level-shifted pull-down driving signals; and
selectively pull-up or pull-down said respective word line as a function of the values of said received level-shifted pull-up driving signal and level-shifted pull-down driving signal;

a respective second set of second buffer circuits arranged on a second side of each of said tiles of the plurality of tiles, wherein each of said second buffer circuits is coupled to a respective word line of the tile and is configured to:
receive a level-shifted pull-down driving signal out of said level-shifted pull-down driving signals; and
selectively pull-down said respective word line as a function of the value of said received level-shifted pull-down driving signal;

wherein:
said pre-decoding signals are in the voltage range of 0 V to about 0.9 V, and said level-shifted pull-up driving signals and level-shifted pull-down driving signals are in the voltage range of 0 V to a tile supply voltage of said at least one memory sector;
said central row decoder includes a plurality of pull-up driver circuits;
each of said pull-up driver circuits is configured to receive a respective first pre-decoding signal, a respective second pre-decoding signal and a respective third pre-decoding signal;
each of said pull-up driver circuits includes a level-shifting NAND logic gate configured to receive as input said respective first, second and third pre-decoding signals to assert and de-assert a respective pull-up control signal; and
each of said pull-up driver circuits is configured to produce a respective level-shifted pull-up driving signal by passing to its output a pull-up bias voltage in response to said respective pull-up control signal being de-asserted, and a shifted ground voltage in response to said respective pull-up control signal being asserted.

2. The non-volatile memory device of claim 1, wherein:
each of said first buffer circuits includes a pull-up p-channel MOS transistor and a p-channel cascode transistor having their current paths arranged in series between a tile supply voltage node that provides said tile supply voltage and the respective word line of the first buffer circuit, wherein a gate terminal of said pull-up p-channel MOS transistor receives said level-shifted pull-up driving signal and a gate terminal of said p-channel cascode transistor receives a pull-up cascode control signal;
each of said first buffer circuits includes a pull-down n-channel MOS transistor and an n-channel cascode transistor having their current paths arranged in series between the respective word line of the first buffer circuit and a ground voltage node that provides a ground voltage, wherein a gate terminal of said pull-down n-channel MOS transistor receives said level-shifted pull-down driving signal and a gate terminal of said n-channel cascode transistor receives a pull-down cascode control signal;
each of said second buffer circuits includes a further pull-down n-channel MOS transistor and a further n-channel cascode transistor having their current paths arranged in series between the respective word line of the second buffer circuit and said ground voltage node, wherein a gate terminal of said further pull-down n-channel MOS transistor receives said level-shifted pull-down driving signal and a gate terminal of said further n-channel cascode transistor receives said pull-down cascode control signal.

3. The non-volatile memory device of claim 2, wherein:
said tile supply voltage, said pull-up cascode control signal and said pull-down cascode control signal are routed vertically within said at least one memory sector;
said level-shifted pull-down driving signals are routed horizontally within said at least one memory sector towards said first buffer circuits and said second buffer circuits that drive a same word line; and
said level-shifted pull-up driving signals are routed both vertically and horizontally within said at least one memory sector towards groups of said first buffer circuits that drive groups of word lines.

4. The non-volatile memory device of claim 1, wherein:
said first buffer circuits in said first set of first buffer circuits are arranged in at least a first subset and a second subset, the first and second subset being spatially contiguous in the vertical direction;
the first buffer circuits in the first subset receive a same level-shifted pull-up driving signal and are configured to drive a respective first subset of word lines of the tile;
the first buffer circuits in the second subset receive a same level-shifted pull-up driving signal different from the level-shifted pull-up driving signal received by the first buffer circuits in the first subset, and are configured to drive a respective second subset of word lines of the tile;
wherein the word lines of said first subset are interleaved with the word lines of said second subset.

5. The non-volatile memory device of claim 1, wherein:
said central row decoder includes a plurality of pull-down driver circuits;
each of said pull-up driver circuits is configured to receive a respective first pre-decoding signal, a respective second pre-decoding signal and a respective third pre-decoding signal;
each of said pull-up driver circuits includes a level-shifting NAND logic gate configured to receive as input said respective first, second and third pre-decoding signals to assert and de-assert a respective pull-down control signal;
each of said pull-up driver circuits includes a plurality of buffer arrangements, wherein each of said buffer arrangements is configured to receive as input said respective pull-down control signal, a respective fourth pre-decoding signal and the complement of said fourth pre-decoding signal, and wherein each of said buffer arrangements is configured to produce a respective level-shifted pull-down driving signal by passing to its output said respective fourth pre-decoding signal in response to said respective pull-down control signal being de-asserted, and said ground voltage in response to said respective pull-down control signal being asserted or said complement of said fourth pre-decoding signal being asserted.

6. A method of operating a non-volatile memory device, the method comprising:
receiving, at a pre-decoder of a memory sector that includes a plurality of tiles arranged horizontally and each including bit lines arranged in columns and word lines arranged in rows, a set of encoded address signals and producing pre-decoding signals as a function of said encoded address signals, wherein a combination of values of said pre-decoding signals identifies one word line within the memory sector;
receiving, at a central row decoder arranged in lines with the tiles, said pre-decoding signals and processing said pre-decoding signals to produce level-shifted pull-up driving signals and level-shifted pull-down driving signals for driving said word lines to a selected state or an unselected state;
receiving, at each of a plurality first buffer circuits arranged on a first side of the tiles, a level-shifted pull-up driving signal out of said level-shifted pull-up driving signals and a level-shifted pull-down driving signal out of said level-shifted pull-down driving signals;
selectively pulling-up or pulling-down a respective word line, via each of said first buffer circuits, as a function of the values of said level-shifted pull-up driving signal and level-shifted pull-down driving signal received at each of said first buffer circuits;
receiving, at each of a plurality of second buffer circuits arranged on a second side of the tiles, a level-shifted pull-down driving signal out of said level-shifted pull-down driving signals;
selectively pulling-down said respective word line, via each of said second buffer circuits, as a function of the value of said level-shifted pull-down driving signal received at each of said second buffer circuits;
wherein said pre-decoding signals are in the voltage range of 0 V to about 0.9 V, and said level-shifted pull-up driving signals and level-shifted pull-down driving signals are in the voltage range of 0 V to a tile supply voltage of the memory sector;
receiving, with a gate terminal of a respective pull-up p-channel transistor of each first buffer circuit, one of the level-shifted pull-up driving signals; and
receiving, with a gate terminal of a respective p-channel cascode transistor of each first buffer circuit having a current path arranged in series with a current path of the respective pull up p-channel transistor between a tile supply voltage node and a word line associated with the respective row of memory cells, a pull-up cascode gate signal;
routing the tile supply voltage, the pull-up cascode control signal and the pull-down cascode control signal vertically within the memory array;
routing the level-shifted pull-down driving signals horizontally within the memory array towards the first buffer circuits and the second buffer circuits that drive a same word line; and
routing the level-shifted pull-up driving signals both vertically and horizontally within the memory array towards groups of the first buffer circuits that drive groups of word lines.

7. The method of claim 6, comprising:
receiving, with a gate terminal of a respective pull-down n-channel transistor of each first buffer circuit, one of the level-shifted pull-down driving signals; and
receiving, with a gate terminal of a respective n-channel cascode transistor of each first buffer circuit having a current path arranged in series with a current path of the respective pull-down n-channel transistor between the respective word line and a ground voltage node, a pull-up cascode gate signal.

8. The method of claim 6, comprising:
setting the tile supply voltage to a value between 1.5 V and 1.8 V during read operations; and
setting the tile supply voltage to a value between 3.5 V and 4.5 V during write operations.

9. The method of claim 6, wherein:
the first buffer circuits are arranged in at least a first subset and a second subset, the first and second subset being spatially contiguous in the vertical direction;
the first buffer circuits in the first subset receive a same level-shifted pull-up driving signal and are configured to drive a respective first subset of word lines of the tile;
the first buffer circuits in the second subset receive a same level-shifted pull-up driving signal different from the level-shifted pull-up driving signal received by the first buffer circuits in the first subset, and are configured to drive a respective second subset of word lines of the tile;
the word lines of the first subset are interleaved with the word lines of the second subset.

10. The method of claim 6, wherein:
the central row decoder includes a plurality of pull-up driver circuits;
each of the pull-up driver circuits is configured to receive a respective first pre-decoding signal, a respective second pre-decoding signal and a respective third pre-decoding signal;
each of the pull-up driver circuits includes a level-shifting NAND logic gate configured to receive as input the respective first, second and third pre-decoding signals to assert and de-assert a respective pull-up control signal;
each of the pull-up driver circuits is configured to produce a respective level-shifted pull-up driving signal by passing to its output a pull-up bias voltage in response to the respective pull-up control signal being de-asserted, and a shifted ground voltage in response to the respective pull-up control signal being asserted.

11. The method of claim 6, wherein:
the central row decoder includes a plurality of pull-down driver circuits;
each of the pull-up driver circuits is configured to receive a respective first pre-decoding signal, a respective second pre-decoding signal and a respective third pre-decoding signal;
each of the pull-up driver circuits includes a level-shifting NAND logic gate configured to receive as input the respective first, second and third pre-decoding signals to assert and de-assert a respective pull-down control signal;
each of the pull-up driver circuits includes a plurality of buffer arrangements, wherein each of the buffer arrangements is configured to receive as input the respective pull-down control signal, a respective fourth pre-decoding signal and the complement of the fourth pre-decoding signal, and wherein each of the buffer arrangements is configured to produce a respective level-shifted pull-down driving signal by passing to its output the respective fourth pre-decoding signal in response to the respective pull-down control signal being de-asserted, and the ground voltage in response to the respective pull-down control signal being asserted or the complement of the fourth pre-decoding signal being asserted.

12. A non-volatile memory device, comprising:
a memory array including a plurality of tiles, each tile including a plurality of memory cells arranged in rows and columns;
a pre-decoder configured to receive a set of encoded address signals and to produce pre-decoding signals as a function of the encoded address signals;
a central row decoder arranged in line with the plurality of tiles and configured to receive the pre-decoding signals and to produce level-shifted pull-up driving signals and level-shifted pull-down driving signals for driving rows of memory cells to a selected state or an unselected state, wherein the central row decoder includes a plurality of pull-down driver circuits; and
a plurality of first buffer circuits arranged on a first side of each of the tiles and each coupled to a respective word line of the tile and configured to pull up or pull down the word line responsive to the level-shifted pull-up driving signals and level-shifted pull-down driving signals, wherein:
  each of said pull-up driver circuits is configured to receive a respective first pre-decoding signal, a respective second pre-decoding signal and a respective third pre-decoding signal;
  each of said pull-up driver circuits includes a level-shifting NAND logic gate configured to receive as input said respective first, second and third pre-decoding signals to assert and de-assert a respective pull-down control signal; and
  each of said pull-up driver circuits includes a plurality of buffer arrangements, wherein each of said buffer arrangements is configured to receive as input said respective pull-down control signal, a respective fourth pre-decoding signal and the complement of said fourth pre-decoding signal, and wherein each of said buffer arrangements is configured to produce a respective level-shifted pull-down driving signal by passing to its output said respective fourth pre-decoding signal in response to said respective pull-down control signal being de-asserted, and said ground voltage in response to said respective pull-down control signal being asserted or said complement of said fourth pre-decoding signal being asserted.

13. The non-volatile memory device of claim 12, comprising a plurality of second buffer circuits arranged on a second side of each of the tiles of the plurality of tiles and each coupled to a respective row of memory cells.

14. The non-volatile memory device of claim 13, wherein each of the second buffer circuits is configured to pull-down the respective word line responsive to the level-shifted pull-down driving signal.

15. The non-volatile memory device of claim 14, wherein the pre-decoding signals are in the voltage range of 0 V to about 0.9 V, wherein the level-shifted pull-up driving signals and level-shifted pull-down driving signals are in the voltage range of 0 V to a tile supply voltage of the memory array.

16. The non-volatile memory device of claim 15, wherein each of the first buffer circuits includes a pull-up p-channel MOS transistor and a p-channel cascode transistor having their current paths arranged in series between a tile supply voltage node that provides the tile supply voltage and the respective word line of the first buffer circuit, wherein a gate terminal of the pull-up p-channel MOS transistor receives the level-shifted pull-up driving signal and a gate terminal of the p-channel cascode transistor receives a pull-up cascode control signal.

17. The non-volatile memory device of claim 16, wherein each of the first buffer circuits includes a pull-down n-channel MOS transistor and an n-channel cascode transistor having their current paths arranged in series between the respective word line of the first buffer circuit and a ground voltage node that provides a ground voltage, wherein a gate terminal of the pull-down n-channel MOS transistor receives the level-shifted pull-down driving signal and a gate terminal of the n-channel cascode transistor receives a pull-down cascode control signal.

* * * * *